(12) United States Patent
Helferich

(10) Patent No.: US 7,957,695 B2
(45) Date of Patent: *Jun. 7, 2011

(54) METHOD FOR INTEGRATING AUDIO AND VISUAL MESSAGING

(75) Inventor: Richard J. Helferich, Encinitas, CA (US)

(73) Assignee: Wireless Science, LLC, Chatsworth, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/625,357

(22) Filed: Nov. 24, 2009

(65) Prior Publication Data

US 2010/0075640 A1    Mar. 25, 2010

Related U.S. Application Data

(60) Division of application No. 10/958,731, filed on Oct. 6, 2004, which is a continuation of application No. 09/408,841, filed on Sep. 30, 1999, now Pat. No. 6,826,407.

(60) Provisional application No. 60/155,055, filed on Sep. 21, 1999, provisional application No. 60/126,939, filed on Mar. 29, 1999.

(51) Int. Cl.
*H04B 7/14* (2006.01)
*H04M 1/66* (2006.01)
*H04M 1/68* (2006.01)
*H04M 3/16* (2006.01)
*H04W 36/00* (2009.01)
*H04W 4/00* (2009.01)

(52) U.S. Cl. .......... 455/15; 455/411; 455/436; 455/466; 370/296; 370/341; 379/88.17; 379/88.18; 715/752

(58) Field of Classification Search .................... 455/15, 455/411, 436, 466; 379/88.17, 88.18; 370/296, 370/341; 715/752
See application file for complete search history.

(56) References Cited

U.S. PATENT DOCUMENTS 2,003,576 A    6/1935    Buhren
(Continued)

FOREIGN PATENT DOCUMENTS

EP    631419    12/1994
(Continued)

OTHER PUBLICATIONS

Anonymous, "Active Channel Server Frequently Asked Questions (FAQ)", Microsoft Corporation, Q181161, 2006, 2 pages.
Anonymous, "Introduction to Active Channel Technology", Microsoft Corporation, 2006, 5 pages.
Engst, A.C., "The Real TidBITS Channel", TidBITS Electronic Publishing, 1998, 4 pages.
Engst, A.C., "TidBITS#349/14/Oct/96," TidBITS Electronic Publishing, 1996, 10 pages.
Form 1449, filed in Patent No. 5,438,611, Campana, Jr. et al., Issued Aug. 1, 1995, 1 page.

(Continued)

*Primary Examiner* — William D Cumming
(74) *Attorney, Agent, or Firm* — Steven G. Lisa, Ltd.; Jon E. Kappes

(57) ABSTRACT

The present invention provides a communication system for integrating audio and visual messaging. The communication system includes a mobile communication device for receiving visual messages and for transmitting voice messages to a recipient, a base station system in communication with the mobile communication device, an electronic mail gateway for delivering visual messages to the base station system for transmission to the mobile communication device, and an integrated mail gateway for receiving from the base station a voice message and addressing information that were both transmitted from the mobile communication device. The integrated mail gateway is programmed to create an e-mail message comprising the voice message. The integrated mail gateway is also programmed to use the addressing information to address the e-mail message, and to send the addressed e-mail message to the recipient.

1 Claim, 14 Drawing Sheets

U.S. PATENT DOCUMENTS

| | | |
|---|---|---|
| 3,118,145 A | 1/1964 | Nee |
| 3,794,983 A | 2/1974 | Sahin |
| 4,039,761 A | 8/1977 | Nicoud et al. |
| 4,042,906 A | 8/1977 | Ezell |
| 4,124,773 A | 11/1978 | Elkins |
| 4,371,752 A | 2/1983 | Matthews et al. |
| 4,412,217 A | 10/1983 | Willard et al. |
| 4,468,813 A | 8/1984 | Burke et al. |
| 4,480,253 A | 10/1984 | Anderson |
| 4,495,647 A | 1/1985 | Burke et al. |
| 4,549,047 A | 10/1985 | Brian et al. |
| 4,573,140 A | 2/1986 | Szeto |
| 4,602,129 A | 7/1986 | Matthews et al. |
| 4,640,991 A | 2/1987 | Matthews et al. |
| 4,644,352 A | 2/1987 | Fujii |
| 4,654,713 A | 3/1987 | Boucharlat et al. |
| 4,710,955 A | 12/1987 | Kauffman |
| 4,713,837 A | 12/1987 | Gordon |
| 4,737,979 A | 4/1988 | Hashimoto |
| 4,769,641 A | 9/1988 | Yoshizawa et al. |
| 4,769,642 A | 9/1988 | Davis et al. |
| 4,786,902 A | 11/1988 | Davis et al. |
| 4,807,155 A | 2/1989 | Cree et al. |
| 4,811,376 A | 3/1989 | Davis et al. |
| 4,812,843 A | 3/1989 | Champion, III et al. |
| 4,821,308 A | 4/1989 | Hashimoto |
| 4,825,456 A | 4/1989 | Rosenberg |
| 4,837,798 A | 6/1989 | Cohen et al. |
| 4,837,800 A | 6/1989 | Freeburg et al. |
| 4,839,734 A | 6/1989 | Takemura |
| 4,845,491 A | 7/1989 | Fascenda et al. |
| 4,853,688 A | 8/1989 | Andros et al. |
| 4,858,232 A | 8/1989 | Diaz et al. |
| 4,864,301 A | 9/1989 | Helferich |
| 4,868,560 A | 9/1989 | Oliwa et al. |
| 4,873,520 A | 10/1989 | Fisch et al. |
| 4,885,577 A | 12/1989 | Nelson |
| 4,897,835 A | 1/1990 | Gaskill et al. |
| 4,905,003 A | 2/1990 | Helferich |
| 4,916,737 A | 4/1990 | Chomet et al. |
| 4,942,598 A | 7/1990 | Davis |
| 4,949,143 A | 8/1990 | Iesaka et al. |
| 4,961,216 A | 10/1990 | Baehr et al. |
| 4,965,569 A | 10/1990 | Bennett et al. |
| 4,975,694 A | 12/1990 | McLaughlin et al. |
| 5,003,576 A | 3/1991 | Helferich |
| 5,005,013 A | 4/1991 | Tsukamoto et al. |
| 5,007,105 A | 4/1991 | Kudoh et al. |
| 5,029,199 A | 7/1991 | Jones et al. |
| 5,040,204 A | 8/1991 | Sasaki et al. |
| 5,043,721 A | 8/1991 | May |
| 5,047,763 A | 9/1991 | Kuznicki et al. |
| 5,065,423 A | 11/1991 | Gaskill |
| 5,070,536 A | 12/1991 | Mahany et al. |
| 5,093,659 A | 3/1992 | Yamada |
| 5,093,901 A | 3/1992 | Cree et al. |
| 5,115,233 A | 5/1992 | Zdunek et al. |
| 5,117,449 A | 5/1992 | Metroka et al. |
| 5,128,980 A | 7/1992 | Choi |
| 5,128,981 A | 7/1992 | Tsukamoto et al. |
| 5,134,724 A | 7/1992 | Gehring et al. |
| 5,138,311 A | 8/1992 | Weinberg |
| 5,138,312 A | 8/1992 | Tsukamoto et al. |
| 5,140,419 A | 8/1992 | Galumbeck et al. |
| 5,146,612 A | 9/1992 | Grosjean et al. |
| 5,153,903 A | 10/1992 | Eastmond et al. |
| 5,159,331 A | 10/1992 | Park et al. |
| 5,159,592 A | 10/1992 | Perkins |
| 5,159,713 A | 10/1992 | Gaskill et al. |
| 5,173,688 A | 12/1992 | DeLuca et al. |
| 5,175,758 A | 12/1992 | Levanto et al. |
| 5,177,780 A | 1/1993 | Kasper et al. |
| 5,182,553 A | 1/1993 | Kung |
| 5,185,604 A | 2/1993 | Nepple et al. |
| 5,192,947 A | 3/1993 | Neustein |
| 5,194,857 A | 3/1993 | Gomez |
| 5,212,636 A | 5/1993 | Nakazawa |
| 5,220,366 A | 6/1993 | King |
| 5,227,774 A | 7/1993 | Benoist |
| 5,239,466 A | 8/1993 | Morgan et al. |
| 5,239,679 A | 8/1993 | Murai |
| 5,241,305 A | 8/1993 | Fascenda et al. |
| 5,247,700 A | 9/1993 | Wohl et al. |
| 5,249,230 A | 9/1993 | Mihm, Jr. |
| 5,257,307 A | 10/1993 | Ise |
| 5,265,033 A | 11/1993 | Vajk et al. |
| 5,283,818 A | 2/1994 | Klausner et al. |
| 5,285,426 A | 2/1994 | Teodoridis |
| 5,285,496 A | 2/1994 | Frank et al. |
| 5,315,635 A | 5/1994 | Kane et al. |
| 5,329,501 A | 7/1994 | Meister et al. |
| 5,329,550 A | 7/1994 | Rousseau et al. |
| 5,333,266 A | 7/1994 | Boaz et al. |
| 5,375,161 A | 12/1994 | Fuller et al. |
| 5,379,031 A | 1/1995 | Mondrosch et al. |
| 5,390,362 A | 2/1995 | Modjeska et al. |
| 5,396,537 A | 3/1995 | Schwendeman |
| 5,396,547 A | 3/1995 | Baals et al. |
| 5,398,021 A | 3/1995 | Moore |
| 5,402,466 A | 3/1995 | Delahanty |
| 5,406,557 A | 4/1995 | Baudoin |
| 5,410,302 A | 4/1995 | Dulaney, III et al. |
| 5,418,835 A | 5/1995 | Frohman et al. |
| 5,420,922 A | 5/1995 | Lundblad et al. |
| RE34,976 E | 6/1995 | Helferich et al. |
| 5,426,422 A | 6/1995 | Vanden Heuvel et al. |
| 5,426,594 A | 6/1995 | Wright et al. |
| 5,428,663 A | 6/1995 | Grimes et al. |
| 5,428,784 A | 6/1995 | Cahill, Jr. |
| 5,432,839 A | 7/1995 | DeLuca |
| 5,436,960 A | 7/1995 | Campana, Jr. et al. |
| 5,440,559 A | 8/1995 | Gaskill |
| 5,442,706 A | 8/1995 | Kung |
| 5,444,438 A | 8/1995 | Goldberg |
| 5,444,671 A | 8/1995 | Tschannen et al. |
| 5,448,759 A | 9/1995 | Krebs et al. |
| 5,452,356 A | 9/1995 | Albert |
| 5,455,579 A | 10/1995 | Bennett et al. |
| 5,455,823 A | 10/1995 | Noreen et al. |
| 5,457,732 A | 10/1995 | Goldberg |
| 5,463,672 A | 10/1995 | Kage |
| 5,473,143 A | 12/1995 | Vak et al. |
| 5,473,320 A | 12/1995 | DeLuca et al. |
| 5,473,667 A | 12/1995 | Neustein |
| 5,475,653 A | 12/1995 | Yamada et al. |
| 5,475,863 A | 12/1995 | Simpson et al. |
| 5,475,866 A | 12/1995 | Ruthenberg |
| 5,479,378 A | 12/1995 | Yamada et al. |
| 5,479,408 A | 12/1995 | Will |
| 5,479,472 A | 12/1995 | Campana, Jr. et al. |
| 5,481,255 A | 1/1996 | Albert et al. |
| 5,483,352 A | 1/1996 | Fukuyama et al. |
| 5,483,595 A | 1/1996 | Owen |
| 5,485,503 A | 1/1996 | Diem |
| 5,487,100 A | 1/1996 | Kane |
| 5,487,167 A | 1/1996 | Dinallo et al. |
| 5,489,894 A | 2/1996 | Murray |
| 5,493,692 A | 2/1996 | Theimer et al. |
| 5,497,373 A | 3/1996 | Hulen et al. |
| 5,506,886 A | 4/1996 | Maine et al. |
| 5,524,009 A | 6/1996 | Tuutijarvi et al. |
| 5,530,438 A | 6/1996 | Bickham et al. |
| 5,530,930 A | 6/1996 | Hahn |
| 5,544,321 A | 8/1996 | Theimer et al. |
| 5,550,535 A | 8/1996 | Park |
| 5,555,376 A | 9/1996 | Theimer et al. |
| 5,555,446 A | 9/1996 | Jasinski |
| 5,557,606 A * | 9/1996 | Moon et al. .................. 370/296 |
| 5,557,659 A | 9/1996 | Hyde-Thomson |
| 5,557,749 A | 9/1996 | Norris |
| 5,559,800 A | 9/1996 | Mousseau et al. |
| 5,559,862 A | 9/1996 | Bhagat et al. |
| 5,561,702 A | 10/1996 | Lipp et al. |
| 5,564,018 A | 10/1996 | Flores et al. |
| 5,568,540 A | 10/1996 | Greco et al. |
| 5,572,196 A | 11/1996 | Sakumoto et al. |
| 5,572,488 A | 11/1996 | Yamada et al. |

| | | | | | | |
|---|---|---|---|---|---|---|
| 5,579,372 A | 11/1996 | Astrom | | 5,826,191 A | 10/1998 | Krishnan |
| 5,581,366 A | 12/1996 | Merchant et al. | | 5,828,882 A | 10/1998 | Hinckley |
| 5,581,593 A | 12/1996 | Engelke et al. | | 5,835,089 A | 11/1998 | Skarbo et al. |
| 5,584,070 A | 12/1996 | Harris et al. | | 5,838,252 A | 11/1998 | Kikinis |
| 5,588,009 A | 12/1996 | Will | | 5,841,837 A | 11/1998 | Fuller et al. |
| 5,590,092 A | 12/1996 | Fehnel | | 5,845,211 A | 12/1998 | Roach, Jr. |
| 5,592,532 A | 1/1997 | Koizumi et al. | | 5,850,594 A | 12/1998 | Cannon et al. |
| 5,600,703 A | 2/1997 | Dang et al. | | 5,857,020 A | 1/1999 | Peterson, Jr. |
| 5,600,708 A | 2/1997 | Meche et al. | | 5,862,325 A | 1/1999 | Reed et al. |
| 5,603,054 A | 2/1997 | Theimer et al. | | 5,864,606 A | 1/1999 | Hanson et al. |
| 5,604,788 A | 2/1997 | Tett | | 5,870,030 A | 2/1999 | DeLuca et al. |
| 5,608,446 A | 3/1997 | Carr et al. | | 5,870,454 A | 2/1999 | Dahlen |
| 5,608,786 A | 3/1997 | Gordon | | 5,872,779 A | 2/1999 | Vaudreuil |
| 5,611,050 A | 3/1997 | Theimer et al. | | 5,872,847 A | 2/1999 | Boyle et al. |
| 5,623,242 A | 4/1997 | Dawson, Jr. et al. | | 5,872,926 A | 2/1999 | Levac et al. |
| 5,625,870 A * | 4/1997 | Moon ............................ 455/411 | | 5,875,436 A | 2/1999 | Kikinis |
| 5,627,525 A | 5/1997 | Kudoh et al. | | 5,878,230 A | 3/1999 | Weber et al. |
| 5,627,876 A * | 5/1997 | Moon ............................ 370/341 | | 5,878,351 A | 3/1999 | Alanara et al. |
| 5,630,060 A | 5/1997 | Tang et al. | | 5,884,159 A | 3/1999 | Thro et al. |
| 5,630,207 A | 5/1997 | Gitlin et al. | | 5,884,160 A | 3/1999 | Kanazaki |
| 5,631,635 A | 5/1997 | Robertson | | 5,887,249 A | 3/1999 | Schmid |
| 5,631,948 A * | 5/1997 | Bartholomew et al. .... 379/88.18 | | 5,889,852 A | 3/1999 | Rosecrans et al. |
| 5,633,916 A | 5/1997 | Goldhagen et al. | | 5,892,909 A | 4/1999 | Grasso et al. |
| 5,635,918 A | 6/1997 | Tett | | 5,893,032 A | 4/1999 | Maeda et al. |
| 5,636,265 A | 6/1997 | O'Connell et al. | | 5,895,471 A | 4/1999 | King et al. |
| 5,638,369 A | 6/1997 | Ayerst et al. | | 5,903,723 A | 5/1999 | Beck et al. |
| 5,644,627 A | 7/1997 | Segal et al. | | 5,905,495 A | 5/1999 | Tanaka et al. |
| 5,649,305 A | 7/1997 | Yoshida | | 5,905,777 A | 5/1999 | Foladare et al. |
| 5,652,789 A | 7/1997 | Miner et al. | | 5,905,865 A | 5/1999 | Palmer et al. |
| 5,654,942 A | 8/1997 | Akahane | | 5,907,805 A | 5/1999 | Chotai |
| 5,661,782 A * | 8/1997 | Bartholomew et al. .... 379/88.18 | | 5,909,491 A | 6/1999 | Luo |
| 5,663,703 A | 9/1997 | Pearlman et al. | | 5,913,032 A | 6/1999 | Schwartz et al. |
| 5,668,880 A | 9/1997 | Alajajian | | 5,918,158 A | 6/1999 | LaPorta et al. |
| 5,675,507 A | 10/1997 | Bobo, II | | 5,920,826 A | 7/1999 | Metso et al. |
| 5,675,627 A | 10/1997 | Yaker | | 5,924,016 A | 7/1999 | Fuller et al. |
| 5,678,176 A * | 10/1997 | Moon ............................ 455/15 | | 5,928,325 A | 7/1999 | Shaughnessy et al. |
| 5,678,179 A | 10/1997 | Turcotte et al. | | 5,930,250 A | 7/1999 | Klok et al. |
| 5,680,442 A | 10/1997 | Bartholomew et al. | | 5,930,701 A | 7/1999 | Skog |
| 5,684,859 A | 11/1997 | Chanroo et al. | | 5,936,547 A | 8/1999 | Lund |
| 5,694,120 A | 12/1997 | Indekeu et al. | | 5,938,725 A | 8/1999 | Hara |
| 5,694,454 A | 12/1997 | Hill et al. | | 5,943,397 A | 8/1999 | Gabin et al. |
| 5,696,500 A | 12/1997 | Diem | | 5,948,059 A | 9/1999 | Woo et al. |
| 5,699,053 A | 12/1997 | Jonsson | | 5,951,638 A | 9/1999 | Hoss et al. |
| 5,703,934 A | 12/1997 | Zicker et al. | | 5,961,590 A | 10/1999 | Mendez et al. |
| 5,706,211 A | 1/1998 | Beletic et al. | | 5,961,620 A | 10/1999 | Trent et al. |
| 5,710,816 A | 1/1998 | Stork et al. | | 5,963,618 A | 10/1999 | Porter |
| 5,717,742 A | 2/1998 | Hyde-Thomson | | 5,966,652 A | 10/1999 | Coad et al. |
| 5,722,071 A | 2/1998 | Berg et al. | | 5,974,447 A | 10/1999 | Cannon et al. |
| 5,724,410 A | 3/1998 | Parvulescu et al. | | 5,974,449 A | 10/1999 | Chang et al. |
| 5,726,643 A | 3/1998 | Tani | | 5,978,837 A | 11/1999 | Foladare et al. |
| 5,737,394 A | 4/1998 | Anderson et al. | | 5,988,857 A | 11/1999 | Ozawa et al. |
| 5,737,395 A | 4/1998 | Irribarren | | 5,991,615 A | 11/1999 | Coppinger et al. |
| 5,737,688 A | 4/1998 | Sakai et al. | | 5,995,597 A | 11/1999 | Woltz et al. |
| 5,740,230 A | 4/1998 | Vaudreuil | | 6,009,173 A | 12/1999 | Sumner |
| 5,742,668 A | 4/1998 | Pepe et al. | | 6,014,559 A | 1/2000 | Amin |
| 5,745,689 A | 4/1998 | Yeager et al. | | 6,018,654 A | 1/2000 | Valentine et al. |
| 5,751,793 A | 5/1998 | Davies et al. | | 6,018,657 A | 1/2000 | Kennedy et al. |
| 5,751,814 A | 5/1998 | Kafri | | 6,021,114 A | 2/2000 | Shaffer et al. |
| 5,752,191 A | 5/1998 | Fuller et al. | | 6,021,190 A | 2/2000 | Fuller et al. |
| 5,761,622 A | 6/1998 | Priest | | 6,021,433 A | 2/2000 | Payne et al. |
| 5,768,381 A | 6/1998 | Hawthorne | | 6,026,153 A | 2/2000 | Fuller et al. |
| 5,774,803 A | 6/1998 | Kariya | | 6,026,292 A | 2/2000 | Coppinger et al. |
| 5,778,315 A | 7/1998 | Proietti | | 6,029,065 A | 2/2000 | Shah |
| 5,781,857 A | 7/1998 | Hwang et al. | | 6,029,171 A | 2/2000 | Smiga et al. |
| 5,787,345 A * | 7/1998 | Moon ............................ 455/436 | | 6,032,039 A | 2/2000 | Kaplan |
| 5,796,394 A | 8/1998 | Wicks et al. | | 6,035,104 A | 3/2000 | Zahariev |
| 5,797,091 A | 8/1998 | Clise et al. | | 6,044,247 A | 3/2000 | Taskett et al. |
| 5,802,165 A | 9/1998 | Kim | | 6,047,053 A | 4/2000 | Miner et al. |
| 5,802,466 A | 9/1998 | Gallant et al. | | 6,047,327 A | 4/2000 | Tso et al. |
| 5,805,886 A | 9/1998 | Skarbo et al. | | 6,052,442 A | 4/2000 | Cooper et al. |
| 5,809,130 A | 9/1998 | Ayala | | 6,052,595 A | 4/2000 | Schellinger et al. |
| 5,809,413 A | 9/1998 | Meche et al. | | 6,058,304 A | 5/2000 | Callaghan et al. |
| 5,809,415 A | 9/1998 | Rossmann | | 6,060,997 A | 5/2000 | Taubenheim et al. |
| 5,809,424 A | 9/1998 | Eizenhoefer | | 6,061,570 A | 5/2000 | Janow |
| 5,812,639 A | 9/1998 | Bartholomew et al. | | 6,064,342 A | 5/2000 | Sandhu et al. |
| 5,812,671 A | 9/1998 | Ross, Jr. | | 6,064,879 A | 5/2000 | Fujiwara et al. |
| 5,812,795 A | 9/1998 | Horovitz et al. | | 6,081,703 A | 6/2000 | Hallqvist |
| 5,812,865 A | 9/1998 | Theimer et al. | | 6,087,956 A | 7/2000 | Helferich |
| 5,815,800 A | 9/1998 | Su et al. | | 6,088,127 A | 7/2000 | Pieterse |

| Patent No. | Kind | Date | Inventor |
|---|---|---|---|
| 6,088,717 | A | 7/2000 | Reed et al. |
| 6,091,957 | A | 7/2000 | Larkins et al. |
| 6,094,574 | A | 7/2000 | Vance et al. |
| 6,097,941 | A | 8/2000 | Helferich |
| 6,115,248 | A | 9/2000 | Canova et al. |
| 6,119,167 | A | 9/2000 | Boyle et al. |
| 6,122,484 | A | 9/2000 | Fuller et al. |
| 6,125,281 | A | 9/2000 | Wells et al. |
| 6,128,490 | A | 10/2000 | Shaheen et al. |
| 6,134,325 | A | 10/2000 | Vanstone et al. |
| 6,134,432 | A | 10/2000 | Holmes et al. |
| 6,138,158 | A | 10/2000 | Boyle et al. |
| 6,144,313 | A | 11/2000 | Nakano |
| 6,144,671 | A | 11/2000 | Perinpanathan et al. |
| 6,145,079 | A | 11/2000 | Mitty |
| 6,147,314 | A | 11/2000 | Han et al. |
| 6,151,443 | A | 11/2000 | Gable et al. |
| 6,151,491 | A | 11/2000 | Farris et al. |
| 6,151,507 | A | 11/2000 | Laiho |
| 6,169,883 | B1 | 1/2001 | Vimpari et al. |
| 6,169,911 | B1 | 1/2001 | Wagner et al. |
| 6,175,859 | B1 | 1/2001 | Mohler |
| 6,178,331 | B1 | 1/2001 | Holmes et al. |
| 6,185,423 | B1 | 2/2001 | Brown et al. |
| 6,195,564 | B1 | 2/2001 | Rydbeck et al. |
| 6,205,330 | B1 | 3/2001 | Winbladh |
| 6,208,839 | B1 | 3/2001 | Davani |
| 6,212,550 | B1 | 4/2001 | Segur |
| 6,215,858 | B1 * | 4/2001 | Bartholomew et al. ..... 379/88.17 |
| 6,216,165 | B1 | 4/2001 | Woltz et al. |
| 6,219,694 | B1 | 4/2001 | Lazaridis et al. |
| 6,222,857 | B1 | 4/2001 | Kammer et al. |
| 6,226,495 | B1 | 5/2001 | Neustein |
| 6,230,133 | B1 | 5/2001 | Bennett, III et al. |
| 6,230,188 | B1 | 5/2001 | Marcus |
| 6,233,318 | B1 | 5/2001 | Picard et al. |
| 6,233,430 | B1 | 5/2001 | Helferich |
| 6,236,804 | B1 | 5/2001 | Tozaki et al. |
| 6,246,871 | B1 | 6/2001 | Ala-Laurila |
| 6,252,588 | B1 | 6/2001 | Dawson |
| 6,253,061 | B1 | 6/2001 | Helferich |
| 6,259,892 | B1 | 7/2001 | Helferich |
| 6,272,532 | B1 | 8/2001 | Feinleib |
| 6,278,862 | B1 | 8/2001 | Henderson |
| 6,282,435 | B1 | 8/2001 | Wagner et al. |
| 6,285,745 | B1 | 9/2001 | Bartholomew et al. |
| 6,285,777 | B2 | 9/2001 | Kanevsky et al. |
| 6,288,715 | B1 | 9/2001 | Bain et al. |
| 6,292,668 | B1 | 9/2001 | Alanara et al. |
| 6,298,231 | B1 | 10/2001 | Heinz |
| 6,301,471 | B1 | 10/2001 | Dahm et al. |
| 6,301,513 | B1 | 10/2001 | Divon et al. |
| 6,317,085 | B1 | 11/2001 | Sandhu et al. |
| 6,317,594 | B1 | 11/2001 | Gossman et al. |
| 6,320,957 | B1 | 11/2001 | Draganoff |
| 6,321,094 | B1 | 11/2001 | Hayashi et al. |
| 6,321,267 | B1 | 11/2001 | Donaldson |
| 6,330,244 | B1 | 12/2001 | Swartz et al. |
| 6,330,308 | B1 | 12/2001 | Cheston et al. |
| 6,333,919 | B2 | 12/2001 | Gaffney |
| 6,333,973 | B1 | 12/2001 | Smith et al. |
| 6,343,219 | B1 | 1/2002 | Wada |
| 6,344,848 | B1 | 2/2002 | Rowe et al. |
| 6,351,523 | B1 | 2/2002 | Detlef |
| 6,356,939 | B1 | 3/2002 | Dahl |
| 6,361,523 | B1 | 3/2002 | Bierman |
| 6,363,082 | B1 | 3/2002 | Kammer et al. |
| RE37,618 | E | 4/2002 | Helferich |
| 6,370,389 | B1 | 4/2002 | Isomursu et al. |
| 6,373,835 | B1 | 4/2002 | Ng |
| 6,381,650 | B1 | 4/2002 | Peacock |
| 6,388,877 | B1 | 5/2002 | Canova et al. |
| 6,389,457 | B2 | 5/2002 | Lazaridis et al. |
| 6,389,572 | B1 | 5/2002 | Garrabrant et al. |
| 6,397,059 | B1 | 5/2002 | Vance et al. |
| 6,401,113 | B2 | 6/2002 | Lazaridis et al. |
| 6,411,827 | B1 | 6/2002 | Minata |
| 6,418,305 | B1 | 7/2002 | Neustein |
| 6,418,307 | B1 | 7/2002 | Amin |
| 6,421,678 | B2 | 7/2002 | Smiga et al. |
| 6,422,147 | B1 | 7/2002 | Shann |
| 6,424,841 | B1 | 7/2002 | Gustafsson |
| 6,425,087 | B1 | 7/2002 | Osborn et al. |
| 6,438,585 | B2 | 8/2002 | Mousseau et al. |
| 6,441,824 | B2 | 8/2002 | Hertzfeld |
| 6,442,243 | B1 | 8/2002 | Valco et al. |
| 6,442,637 | B1 | 8/2002 | Hawkins et al. |
| 6,449,344 | B1 | 9/2002 | Goldfinger |
| 6,457,134 | B1 | 9/2002 | Lemke et al. |
| 6,459,360 | B1 | 10/2002 | Helferich |
| 6,462,646 | B2 | 10/2002 | Helferich |
| 6,463,463 | B1 | 10/2002 | Godfrey et al. |
| 6,463,464 | B1 | 10/2002 | Lazaridis et al. |
| 6,484,027 | B1 | 11/2002 | Mauney et al. |
| 6,501,834 | B1 | 12/2002 | Milewski et al. |
| 6,505,237 | B2 | 1/2003 | Beyda et al. |
| 6,510,453 | B1 | 1/2003 | Apfel et al. |
| 6,516,202 | B1 | 2/2003 | Hawkins et al. |
| 6,522,879 | B2 | 2/2003 | Myer et al. |
| 6,523,124 | B1 | 2/2003 | Lunsford et al. |
| 6,526,127 | B1 | 2/2003 | Piotrowski et al. |
| 6,539,476 | B1 | 3/2003 | Marianetti et al. |
| 6,546,083 | B1 | 4/2003 | Chaves et al. |
| 6,564,249 | B2 | 5/2003 | Shiigi |
| 6,567,179 | B1 | 5/2003 | Sato et al. |
| 6,580,784 | B2 | 6/2003 | Rodriquez et al. |
| 6,580,787 | B1 | 6/2003 | Akhteruzzaman et al. |
| 6,587,681 | B1 | 7/2003 | Sawai |
| 6,587,693 | B1 | 7/2003 | Lumme et al. |
| 6,590,588 | B2 | 7/2003 | Lincke et al. |
| 6,597,688 | B2 | 7/2003 | Narasimhan et al. |
| 6,597,903 | B1 | 7/2003 | Dahm et al. |
| 6,611,254 | B1 | 8/2003 | Griffin et al. |
| 6,622,147 | B1 | 9/2003 | Smiga et al. |
| 6,625,142 | B1 | 9/2003 | Joffe et al. |
| 6,625,642 | B1 | 9/2003 | Naylor et al. |
| 6,636,522 | B1 | 10/2003 | Perinpanathan et al. |
| 6,636,733 | B1 | 10/2003 | Helferich |
| 6,658,409 | B1 | 12/2003 | Nomura et al. |
| 6,662,195 | B1 | 12/2003 | Langseth et al. |
| 6,665,547 | B1 | 12/2003 | Ehara |
| 6,665,803 | B2 | 12/2003 | Osborn et al. |
| 6,671,715 | B1 | 12/2003 | Langseth et al. |
| 6,687,839 | B1 | 2/2004 | Tate et al. |
| 6,694,316 | B1 | 2/2004 | Langseth et al. |
| 6,701,378 | B1 | 3/2004 | Gilhuly et al. |
| 6,728,530 | B1 | 4/2004 | Heinonen et al. |
| 6,741,980 | B1 | 5/2004 | Langseth et al. |
| 6,744,528 | B2 | 6/2004 | Picoult et al. |
| 6,744,874 | B2 | 6/2004 | Wu |
| 6,751,453 | B2 | 6/2004 | Schemers et al. |
| 6,760,423 | B1 | 7/2004 | Todd |
| 6,766,490 | B1 | 7/2004 | Garrabrant et al. |
| 6,771,949 | B1 | 8/2004 | Corliss |
| 6,775,264 | B1 | 8/2004 | Kurganov |
| 6,775,689 | B1 | 8/2004 | Raghunandan |
| 6,779,019 | B1 | 8/2004 | Mousseau et al. |
| 6,779,022 | B1 | 8/2004 | Horstmann et al. |
| 6,788,767 | B2 | 9/2004 | Lambke |
| 6,792,112 | B1 | 9/2004 | Campbell et al. |
| 6,792,544 | B2 | 9/2004 | Hashem et al. |
| 6,807,277 | B1 | 10/2004 | Doonan et al. |
| 6,813,489 | B1 | 11/2004 | Wu et al. |
| 6,823,225 | B1 | 11/2004 | Sass |
| 6,826,407 | B1 * | 11/2004 | Helferich ...................... 455/466 |
| 6,832,130 | B1 | 12/2004 | Pintsov et al. |
| 6,868,498 | B1 | 3/2005 | Katsikas |
| 6,869,016 | B2 | 3/2005 | Waxelbaum |
| 6,871,214 | B2 | 3/2005 | Parsons et al. |
| 6,880,079 | B2 | 4/2005 | Kefford et al. |
| 6,882,709 | B1 | 4/2005 | Sherlock et al. |
| 6,886,096 | B2 | 4/2005 | Appenzeller et al. |
| 6,892,074 | B2 | 5/2005 | Tarkiainen et al. |
| 6,912,285 | B2 | 6/2005 | Jevans |
| 6,912,400 | B1 | 6/2005 | Olsson et al. |
| RE38,787 | E | 8/2005 | Sainton et al. |
| 6,938,065 | B2 | 8/2005 | Jain |
| 6,941,349 | B2 | 9/2005 | Godfrey et al. |

| Patent/Publication | Date | Inventor |
|---|---|---|
| 6,944,283 B1 | 9/2005 | Klein |
| 6,950,679 B2 | 9/2005 | Sugiyama et al. |
| 6,952,599 B2 | 10/2005 | Noda et al. |
| 6,980,792 B2 | 12/2005 | Iivonen et al. |
| 6,983,138 B1 | 1/2006 | Helferich |
| 6,990,587 B2 | 1/2006 | Willins et al. |
| 7,003,308 B1 | 2/2006 | Fuoss et al. |
| 7,006,459 B2 | 2/2006 | Kokot et al. |
| 7,007,239 B1 | 2/2006 | Hawkins et al. |
| 7,013,391 B2 | 3/2006 | Herle et al. |
| 7,017,181 B2 | 3/2006 | Spies et al. |
| 7,020,688 B2 | 3/2006 | Sykes, Jr. |
| 7,023,967 B1 | 4/2006 | Andersson et al. |
| 7,031,437 B1 | 4/2006 | Parsons et al. |
| 7,054,905 B1 | 5/2006 | Hanna et al. |
| 7,058,390 B2 | 6/2006 | Chikazawa |
| 7,062,536 B2 | 6/2006 | Fellenstein et al. |
| 7,065,189 B2 | 6/2006 | Wakabayashi |
| 7,068,993 B2 | 6/2006 | Rai et al. |
| 7,072,642 B2 | 7/2006 | Yabe et al. |
| 7,076,528 B2 | 7/2006 | Premutico |
| 7,079,006 B1 | 7/2006 | Abe |
| 7,082,469 B2 | 7/2006 | Gold et al. |
| 7,082,536 B2 | 7/2006 | Filipi-Martin |
| 7,088,990 B1 | 8/2006 | Isomursu et al. |
| 7,092,743 B2 | 8/2006 | Vegh |
| 7,100,048 B1 | 8/2006 | Czajkowski et al. |
| 7,107,246 B2 | 9/2006 | Wang |
| 7,113,601 B2 | 9/2006 | Ananda |
| 7,113,803 B2 | 9/2006 | Dehlin |
| 7,113,979 B1 | 9/2006 | Smith et al. |
| 7,116,762 B2 | 10/2006 | Bennett, III et al. |
| 7,116,997 B2 | 10/2006 | Byers et al. |
| 7,133,687 B1 | 11/2006 | El-Fishawy et al. |
| 7,146,009 B2 | 12/2006 | Andivahis et al. |
| 7,149,537 B1 | 12/2006 | Kupsh et al. |
| 7,149,893 B1 | 12/2006 | Leonard et al. |
| 7,155,241 B2 | 12/2006 | Helferich |
| 7,188,186 B1 | 3/2007 | Meyer et al. |
| 7,218,919 B2 | 5/2007 | Vaananen |
| 7,233,655 B2 | 6/2007 | Gailey et al. |
| 7,239,338 B2 | 7/2007 | Krisbergh et al. |
| 7,251,314 B2 | 7/2007 | Huang |
| 7,254,384 B2 | 8/2007 | Gailey et al. |
| 7,277,692 B1 | 10/2007 | Jones et al. |
| 7,277,716 B2 | 10/2007 | Helferich |
| 7,280,838 B2 | 10/2007 | Helferich |
| 7,286,817 B2 | 10/2007 | Provost et al. |
| 7,289,797 B2 | 10/2007 | Kato |
| 7,299,036 B2 | 11/2007 | Sanding et al. |
| 7,299,046 B1 | 11/2007 | Ozugur et al. |
| 7,317,929 B1 | 1/2008 | El-Fishawy et al. |
| 7,333,817 B2 | 2/2008 | Tsuchiyama |
| 7,353,018 B2 | 4/2008 | Mauney et al. |
| 7,403,793 B2 | 7/2008 | Mauney et al. |
| 7,433,461 B1 | 10/2008 | Bauer |
| 2001/0005857 A1 | 6/2001 | Lazaridis et al. |
| 2001/0005860 A1 | 6/2001 | Lazaridis et al. |
| 2001/0005861 A1 | 6/2001 | Mousseau et al. |
| 2001/0013071 A1 | 8/2001 | Lazaridis et al. |
| 2001/0048737 A1 | 12/2001 | Goldberg et al. |
| 2001/0054115 A1 | 12/2001 | Ferguson et al. |
| 2002/0012323 A1 | 1/2002 | Petite |
| 2002/0023131 A1 | 2/2002 | Wu et al. |
| 2002/0029258 A1 | 3/2002 | Mousseau et al. |
| 2002/0032658 A1 | 3/2002 | Oki et al. |
| 2002/0035687 A1 | 3/2002 | Skantze |
| 2002/0038298 A1 | 3/2002 | Kusakabe et al. |
| 2002/0039419 A1 | 4/2002 | Akimoto et al. |
| 2002/0049818 A1 | 4/2002 | Gilhuly et al. |
| 2002/0052218 A1 | 5/2002 | Rhee |
| 2002/0065887 A1 | 5/2002 | Paik et al. |
| 2002/0065895 A1 | 5/2002 | Zhang et al. |
| 2002/0087645 A1 | 7/2002 | Ertugrul et al. |
| 2002/0091777 A1 | 7/2002 | Schwartz |
| 2002/0091782 A1 | 7/2002 | Benninghoff |
| 2002/0101998 A1 | 8/2002 | Wong et al. |
| 2002/0107928 A1 | 8/2002 | Chalon |
| 2002/0120696 A1 | 8/2002 | Mousseau et al. |
| 2002/0120788 A1 | 8/2002 | Wang et al. |
| 2002/0128036 A1 | 9/2002 | Yach et al. |
| 2002/0138735 A1 | 9/2002 | Felt et al. |
| 2002/0138759 A1 | 9/2002 | Dutta |
| 2002/0156691 A1 | 10/2002 | Hughes et al. |
| 2002/0178353 A1 | 11/2002 | Graham |
| 2002/0181701 A1 | 12/2002 | Lee |
| 2002/0194281 A1 | 12/2002 | McConnell et al. |
| 2002/0194285 A1 | 12/2002 | Mousseau et al. |
| 2003/0005066 A1 | 1/2003 | Lazaridis et al. |
| 2003/0009698 A1 | 1/2003 | Lindeman et al. |
| 2003/0037261 A1 | 2/2003 | Meffert et al. |
| 2003/0048905 A1 | 3/2003 | Gehring et al. |
| 2003/0050987 A1 | 3/2003 | Lazaridis et al. |
| 2003/0055902 A1 | 3/2003 | Amir et al. |
| 2003/0061511 A1 | 3/2003 | Fischer |
| 2003/0078058 A1 | 4/2003 | Vatanen et al. |
| 2003/0081621 A1 | 5/2003 | Godfrey et al. |
| 2003/0088633 A1 | 5/2003 | Chiu et al. |
| 2003/0097361 A1 | 5/2003 | Huang et al. |
| 2003/0115448 A1 | 6/2003 | Bouchard |
| 2003/0120733 A1 | 6/2003 | Forman |
| 2003/0126216 A1 | 7/2003 | Avila et al. |
| 2003/0126220 A1 | 7/2003 | Wanless |
| 2003/0142364 A1 | 7/2003 | Goldstone |
| 2003/0182575 A1 | 9/2003 | Korfanta |
| 2003/0187938 A1 | 10/2003 | Mousseau et al. |
| 2003/0191808 A1 | 10/2003 | Adler et al. |
| 2003/0194990 A1 | 10/2003 | Helferich |
| 2003/0204568 A1 | 10/2003 | Bhargava et al. |
| 2003/0220979 A1 | 11/2003 | Hejl |
| 2003/0222765 A1 | 12/2003 | Curbow et al. |
| 2003/0235307 A1 | 12/2003 | Miyamoto |
| 2003/0235308 A1 | 12/2003 | Boynton et al. |
| 2003/0237082 A1 | 12/2003 | Thurlow |
| 2004/0019780 A1 | 1/2004 | Waugh et al. |
| 2004/0021889 A1 | 2/2004 | McAfee et al. |
| 2004/0024824 A1 | 2/2004 | Ferguson et al. |
| 2004/0030906 A1 | 2/2004 | Marmigere et al. |
| 2004/0052340 A1 | 3/2004 | Joffe et al. |
| 2004/0059598 A1 | 3/2004 | L. Wellons et al. |
| 2004/0059914 A1 | 3/2004 | Karaoguz |
| 2004/0060056 A1 | 3/2004 | Wellons et al. |
| 2004/0073619 A1 | 4/2004 | Gilhuly et al. |
| 2004/0078488 A1 | 4/2004 | Patrick |
| 2004/0083271 A1 | 4/2004 | Tosey |
| 2004/0083365 A1 | 4/2004 | Renier et al. |
| 2004/0111478 A1 | 6/2004 | Gross et al. |
| 2004/0111480 A1 | 6/2004 | Yue |
| 2004/0116073 A1 | 6/2004 | Mauney et al. |
| 2004/0116119 A1 | 6/2004 | Lewis et al. |
| 2004/0122847 A1 | 6/2004 | Rodgers |
| 2004/0122905 A1 | 6/2004 | Smith et al. |
| 2004/0137884 A1 | 7/2004 | Engstrom et al. |
| 2004/0137955 A1 | 7/2004 | Engstrom et al. |
| 2004/0165727 A1 | 8/2004 | Moreh et al. |
| 2004/0185877 A1 | 9/2004 | Asthana et al. |
| 2004/0194116 A1 | 9/2004 | McKee et al. |
| 2004/0196978 A1 | 10/2004 | Godfrey et al. |
| 2004/0198348 A1 | 10/2004 | Gresham et al. |
| 2004/0199669 A1 | 10/2004 | Riggs et al. |
| 2004/0202327 A1 | 10/2004 | Little et al. |
| 2004/0203642 A1 | 10/2004 | Zatloukal et al. |
| 2004/0205106 A1 | 10/2004 | Adler et al. |
| 2004/0205248 A1 | 10/2004 | Little et al. |
| 2004/0205330 A1 | 10/2004 | Godfrey et al. |
| 2004/0208296 A1 | 10/2004 | Aboujaoude et al. |
| 2004/0212639 A1 | 10/2004 | Smoot et al. |
| 2004/0221014 A1 | 11/2004 | Tomkow |
| 2004/0221048 A1 | 11/2004 | Ogier |
| 2004/0230657 A1 | 11/2004 | Tomkow |
| 2004/0243677 A1 | 12/2004 | Curbow et al. |
| 2004/0243844 A1 | 12/2004 | Adkins |
| 2004/0243847 A1 | 12/2004 | Way |
| 2004/0249768 A1 | 12/2004 | Kontio et al. |
| 2004/0249895 A1 | 12/2004 | Way |
| 2004/0249899 A1 | 12/2004 | Shiigi |
| 2004/0252727 A1 | 12/2004 | Mousseau et al. |
| 2004/0264121 A1 | 12/2004 | Orriss |

| | | |
|---|---|---|
| 2004/0266441 A1 | 12/2004 | Sinha et al. |
| 2004/0283844 | 12/2004 | Adkins |
| 2005/0003809 A1 | 1/2005 | Kato |
| 2005/0009502 A1 | 1/2005 | Little et al. |
| 2005/0015455 A1 | 1/2005 | Liu |
| 2005/0019634 A1 | 1/2005 | Legg |
| 2005/0025172 A1 | 2/2005 | Frankel |
| 2005/0025291 A1 | 2/2005 | Peled et al. |
| 2005/0025297 A1 | 2/2005 | Finnigan |
| 2005/0038863 A1 | 2/2005 | Onyon et al. |
| 2005/0044160 A1 | 2/2005 | McElligott |
| 2005/0055413 A1 | 3/2005 | Keohane et al. |
| 2005/0058124 A1 | 3/2005 | Helferich |
| 2005/0058260 A1 | 3/2005 | Lasensky et al. |
| 2005/0060720 A1 | 3/2005 | Mayer |
| 2005/0076109 A1 | 4/2005 | Mathew et al. |
| 2005/0091329 A1 | 4/2005 | Friskel |
| 2005/0099654 A1 | 5/2005 | Chen |
| 2005/0099998 A1 | 5/2005 | Semper |
| 2005/0102381 A1 | 5/2005 | Jiang et al. |
| 2005/0108336 A1 | 5/2005 | Naick et al. |
| 2005/0108359 A1 | 5/2005 | Hyder et al. |
| 2005/0114652 A1 | 5/2005 | Swedor et al. |
| 2005/0130361 A1 | 6/2005 | Balasubramanian et al. |
| 2005/0132010 A1 | 6/2005 | Muller |
| 2005/0135681 A1 | 6/2005 | Schirmer |
| 2005/0137009 A1 | 6/2005 | Vetelainen |
| 2005/0138353 A1 | 6/2005 | Spies |
| 2005/0141718 A1 | 6/2005 | Yu et al. |
| 2005/0148356 A1 | 7/2005 | Ferguson et al. |
| 2005/0159107 A1 | 7/2005 | Mauney et al. |
| 2005/0163320 A1 | 7/2005 | Brown et al. |
| 2005/0165740 A1 | 7/2005 | Kerr et al. |
| 2005/0176451 A1 | 8/2005 | Helferich |
| 2005/0180576 A1 | 8/2005 | Jevans |
| 2005/0188024 A1 | 8/2005 | Singer |
| 2005/0188045 A1 | 8/2005 | Katsikas |
| 2005/0198143 A1 | 9/2005 | Moody et al. |
| 2005/0198170 A1 | 9/2005 | LeMay et al. |
| 2005/0198506 A1 | 9/2005 | Qi et al. |
| 2005/0210064 A1 | 9/2005 | Caldini et al. |
| 2005/0210106 A1 | 9/2005 | Cunningham |
| 2005/0210246 A1 | 9/2005 | Faure |
| 2005/0210394 A1* | 9/2005 | Crandall et al. .............. 715/752 |
| 2005/0216587 A1 | 9/2005 | John |
| 2005/0216735 A1 | 9/2005 | Huang |
| 2005/0229258 A1 | 10/2005 | Pigin |
| 2005/0251558 A1 | 11/2005 | Zaki |
| 2005/0257057 A1 | 11/2005 | Ivanov et al. |
| 2005/0265551 A1 | 12/2005 | Hara |
| 2005/0282525 A1 | 12/2005 | Adams et al. |
| 2006/0013368 A1 | 1/2006 | LaBaw |
| 2006/0019638 A1 | 1/2006 | Chiu et al. |
| 2006/0019639 A1 | 1/2006 | Adams et al. |
| 2006/0020667 A1 | 1/2006 | Wang et al. |
| 2006/0021038 A1 | 1/2006 | Brown et al. |
| 2006/0021066 A1 | 1/2006 | Clayton et al. |
| 2006/0026246 A1 | 2/2006 | Fukuhara et al. |
| 2006/0029191 A1 | 2/2006 | Miller et al. |
| 2006/0041505 A1 | 2/2006 | Enyart |
| 2006/0041625 A1 | 2/2006 | Chen et al. |
| 2006/0046720 A1 | 3/2006 | Toropainen et al. |
| 2006/0046757 A1 | 3/2006 | Hoover et al. |
| 2006/0047766 A1 | 3/2006 | Spadea |
| 2006/0053202 A1 | 3/2006 | Foo et al. |
| 2006/0068768 A1 | 3/2006 | Sanding et al. |
| 2006/0069737 A1 | 3/2006 | Gilhuly et al. |
| 2006/0072761 A1 | 4/2006 | Johnson et al. |
| 2006/0074706 A1 | 4/2006 | Gilham |
| 2006/0075027 A1 | 4/2006 | Zager et al. |
| 2006/0080384 A1 | 4/2006 | Robinson et al. |
| 2006/0090065 A1 | 4/2006 | Bush et al. |
| 2006/0095510 A1 | 5/2006 | Rouse et al. |
| 2006/0101119 A1 | 5/2006 | Qureshi et al. |
| 2006/0133585 A1 | 6/2006 | Daigle et al. |
| 2006/0135128 A1 | 6/2006 | Skoog |
| 2006/0155698 A1 | 7/2006 | Vayssiere |
| 2006/0155812 A1 | 7/2006 | Looman |
| 2006/0168065 A1 | 7/2006 | Martin |
| 2006/0168072 A1 | 7/2006 | Park |
| 2006/0177015 A1 | 8/2006 | Skakkebaek et al. |
| 2006/0182124 A1 | 8/2006 | Cole et al. |
| 2006/0187897 A1 | 8/2006 | Dabbs et al. |
| 2006/0190533 A1 | 8/2006 | Shannon et al. |
| 2006/0194572 A1 | 8/2006 | Fresonke et al. |
| 2006/0200528 A1 | 9/2006 | Pathiyal |
| 2006/0217112 A1 | 9/2006 | Mo |
| 2006/0218224 A1 | 9/2006 | Agrawal et al. |
| 2006/0218244 A1 | 9/2006 | Rassmussen et al. |
| 2006/0221916 A1 | 10/2006 | Taylor et al. |
| 2006/0224893 A1 | 10/2006 | Sales et al. |
| 2006/0230266 A1 | 10/2006 | Maes |
| 2006/0233370 A1 | 10/2006 | Jung et al. |
| 2006/0234680 A1 | 10/2006 | Doulton |
| 2006/0239424 A1 | 10/2006 | Walter |
| 2006/0240868 A1 | 10/2006 | Kaplan et al. |
| 2006/0247962 A1 | 11/2006 | Harvey et al. |
| 2006/0248148 A1 | 11/2006 | Timmins et al. |
| 2006/0259558 A1 | 11/2006 | Yen |
| 2006/0265660 A1 | 11/2006 | Hullot et al. |
| 2006/0270461 A1 | 11/2006 | Won et al. |
| 2006/0285533 A1 | 12/2006 | Divine et al. |
| 2006/0286990 A1 | 12/2006 | Juan et al. |
| 2007/0042747 A1 | 2/2007 | Sun |
| 2007/0117541 A1 | 5/2007 | Helferich |
| 2007/0162454 A1 | 7/2007 | D'Albora et al. |
| 2007/0265838 A1 | 11/2007 | Chopra et al. |
| 2008/0037582 A1 | 2/2008 | Wang |
| 2008/0039052 A1 | 2/2008 | Knowles |
| 2009/0191848 A1 | 7/2009 | Helferich |

FOREIGN PATENT DOCUMENTS

| | | |
|---|---|---|
| EP | 0 695 071 | 1/1996 |
| EP | 777394 | 6/1997 |
| EP | 831664 | 9/1997 |
| EP | 0 505 489 | 11/1997 |
| EP | 0 624 993 | 12/2003 |
| JP | 3/500955 | 2/1991 |
| JP | 03232325 | 10/1991 |
| JP | 6-70292 | 3/1994 |
| JP | 6-261121 | 9/1994 |
| JP | 6-276226 | 9/1994 |
| JP | 06245254 | 9/1994 |
| JP | 6/318899 | 11/1994 |
| JP | 7/503826 | 4/1995 |
| JP | 7/245773 | 9/1995 |
| JP | 8-019025 | 1/1996 |
| JP | 8-97854 | 4/1996 |
| JP | 8-163637 | 6/1996 |
| JP | 8/228368 | 9/1996 |
| JP | 8-265245 | 10/1996 |
| JP | 08336182 | 12/1996 |
| JP | 9-146824 | 6/1997 |
| JP | 9-200250 | 7/1997 |
| JP | 2001/517891 | 10/2001 |
| JP | 2000-513362 | 9/2005 |
| KR | 00164369 | 9/1998 |
| WO | 89/05009 | 6/1989 |
| WO | 97/08906 | 3/1997 |
| WO | 9731488 | 8/1997 |
| WO | 97/32439 | 9/1997 |
| WO | 9858476 | 12/1998 |
| WO | 9965256 | 12/1999 |

OTHER PUBLICATIONS

Gillay, C.Z., "Subscriptions, Channels, and Active Desktop", TechNotes, Franklin, Beedle & Associates, Inc., 1999, pp. 1/6.

International Preliminary Examination Report dated Jul. 10 2001 (7 pages) PCT/US00/08261 Jul. 1 2001.

Khare, R., et al., "Scenarios for an Internet/Scale Event Notification Service (ISENS)", Internet/Draft, Aug. 13, 1998, 18 pages.

PLUS Patent Linguistics Utility Search Results for U.S. Appl. No. 10/445,257, Searched Mar. 16, 2005.

Siewiorek, D.P., et al., "Computer Structures: Principles and Examples", McGraw/Hill Book Company, 1982, 21 pages.

Statutory Invention Registration No. H610; Date: Mar. 7, 1989, Focarile et al.

Winnick Cluts, N., et al., "A Preview of Active Channel and the Active Desktop for Internet Explorer 4.0", Microsoft Corporation, 1997, 13 pages.
Anonymous, "Envoy Wireless Communicator User's Guide," Motorola, Inc. (1994).
Anonymous, "General Magic OS Targets US, Japan," Reed Business Information (1996).
Anonymous, "MessagePad 2000: New Newton Exceeds Expectation," TidBITS #379 (May 12, 1997).
Anonymous, "NETCOM and RadioMail form Strategic Alliance Enabling NETCOM Customers to Exchange Email, Send Faxes and Access Web Sites Wireless," Business Wire (Dec. 11, 2006).
Anonymous, "New Features of the Newton 2.0 Operating System," Apple Computer, Inc. (1995).
Anonymous, "New RadioMail Package Brings Maximum Affordability and Simplicity to Wireless Communications," AllBusiness (Feb. 27, 1996).
Anonymous, "Newton Apple MessagePad Handbook," Apple Computer, Inc. (1995).
Anonymous, "Newton Internet Enabler," (1997).
Anonymous, "Newton MessagePad (Original) Specs," EveryMac.com (1996).
Anonymous, "RadioMail Corporation Releases Wireless Internet Access Solution for CDPD Carriers," Business Wire (Oct. 7, 1996).
Anonymous, "Using E/Mail on Your Newton Device," Apple Computer, Inc. (1997).
Denise Shelton, "RadioMail can Find, Retrieve Web Pages," CNET News (Jun. 4, 1996).
Ira Brodsky, "Instant Gratification," Telephone Online (Jan. 15, 1999).
Mark Kellner, "Earthquake and RadioMail," The Washington Times (Jan. 24, 1994).
Mike Fine, "The AllPoints Wireless PC Card and RadioMail Service," www.palmtoppaer.com (Date Unknown).
Stuart Price, "Product Reviews: Eudora Pro for Newton 1.0," MacUser (Dec. 22, 1996).
Anonymous, "Sony Electronics Introduces Magic Link PIC/2000," BusinessWire (Oct. 30, 1995).
Micheal M. Tao, et al., "Always On, Always Connected Mobile Computing," IEEE (1996).
Anonymous, "Newton Solutions Guide," Apple Computer, Inc. (1995).
Anonymous, "Newton Messaging Card Arrives," MacWeek (Sep. 1993).
Anonymous, "Allpen's Nethopper Lets Apple Newton Owners Surf Internet, Intranets," Tribune Business News (Jun. 1996).
Anonymous, § 3.2.9 ETSI GSM 3.40, "Digital Cellular Telecommunications System (Phase 2+) Technical Realisation of the Short Message Service Point/to/Point," v4.13.0, (May 1996).
"New Wyndmail version 1.5 features another first for wireless industry," Busines Wire (Author Unknown) (Aug. 19, 1996).
"WyndMail wireless e/mail now provides "Message Header Preview" for Apple Powerbook and MessagePad," Business Wire (Author Unknown) (Jan. 9, 1997).
"Notice of Grounds of Rejection," Japanese Patent App. No. 2008/302127, dated Jun. 30, 2009.
"Notice of Grounds of Rejection," Japanese Patent App. No. 2009-052858, dated Oct. 6, 2009.
Anonymous, "Second Generation Personal Handy Phone System," pp. 117-119, dated Jun. 25, 1996.
"Notice of Grounds of Rejection," Japanese Patent App. No. 2009-052859, dated Oct. 6, 2009.
Freed, Borenstein, RFC 2045, MIME format standards, Nov. 1996.
"Claim Charts Applying 5,905,777 (Foldare et al.) to Selected Claims of Helferich U.S. Patent Nos. 7,499,716, 7,280,838, and 7,155,241" (Apr. 15, 2010).
"Final Rejection," Japanese Patent App. No. 2008-302127, dated Apr. 13, 2010.
"Final Rejection," Japanese Patent App. No. 2009-052858, dated Apr. 22, 2010.
Fuhrt, Design issues for interactive television systems, Computer Magazine, May 1995.
Henriksen, Mobile Data Network System Description, Norwegian Telecommunications Administration Research Dept, Apr. 1986.
Crispin, Interactive Mail Access Protocol—Version 2, Request for Comments 1176, Network Working Group, Aug. 1990.
Kaspersen, vol. 1 Network architecture addressing and routing, Mobile Data Network Description, Teledirektorates forskningsavdeling, Mar. 1989.
Kaspersen, vol. 2 Service and service elements, "Mobile Data Network Description", Teledirektoratets forskningsavdeling, Apr. 1989.
Kaspersen, vol. 6 Requirements to the Base Station, "Mobile Data Network Description", Teledirektoratets forskningsavdeling, Jul. 1989.
Kaspersen, vol. 7 Requirements to the Mobile Stations, "Mobile Data Network Description", Teledirektoratets forskningsavdeling, Sep. 1989.
Kramer, Use of two-way wireless messaging for personal telephone management, University of Wisconsin Record, Jun. 1905.
Anonymous, Changes from Pine 3.96 to 4.00, Computing and Networking, University of Washington, Feb. 2001.
Anonymous, Active Paper's Presto!Mail to be bundled with Envoy 150 Wireless Communicator from Motorola, Business Wire, Apr. 1996.
Crispin, Internet Message Access Protocol Version 4, Request for Comments 2060, Network Working Group, Dec. 1996.
Rodriquez, Motorola provides NetWare access to paging networks, InfoWorld, May 1995.
Joseph, Rover: a toolkit for mobile information access, SIGOPS Dec. 1995, Jan. 1900.
Hardy, SkyTel is set to launch two-way-paging—Mtel unit is poised for big gains in wireless business, Wall Street Journal, Sep. 1995.
Anonymous, Motorola unveils next-generation Tango products at PCS '96; Tanto Lite guarantees message delivery and receipt, Business Wire, Sep. 1996.
Kaspersen, vol. 3 Protocols and protocol hierarchy within the MDN, "Mobile Data Network Description", Teledirektoratets forskningsavdeling, May 1989.
Kaspersen, vol. 4 Specification of DTL and DTP within the MDN, "Mobile Data Network Description", Teledirektoratets forskningsavdeling, Jun. 1989.
Kaspersen, vol. 8 Specification of the MDN-MHS inter-working, "Mobile Data Network Description", Teledirektoratets forskningsavdeling, Aug. 1989.
Anonymous, UP Browser Manual, Unwired Planet, Aug. 1996.
Anonymous, UP HDML Language Reference, Jul. 1996.
Anonymous, UP Up.Link Developer's Guide, Jul. 1996.
Verjinkski, PHASE, a portable host access system environment, Unisys Defense Systems , Jan. 1900.
Kylanpaa, Nomadic access to information services by a GSM phone, Computer & Graphics, Jun. 1905.
Anonymous, Cost of Ownership Analysis Instructions, Unwired Planet, Jun. 2010.
Anonymous, The Mobile Intranet—wireless internet access with UP Link by Unwired Planet, Jun. 1905.
Butler, Post Office Protocol Version 2, Request for Comments 937, Network Working Group, Feb. 1985.
Taylor, Internetwork Mobility—the CDPD Approach, Jun. 1996.
Anonymous, Narrowband Sockets Specification Intel and Nokia, Sep. 1996.
deLespinasse, Rover Mosaic: E-mail communication for a full-function web browser, Master's Thesis, MIT, Jun. 1995.
"Notice of Grounds of Rejection," Japanese Patent App. No. 2010-001327, dated Aug. 17, 2010 (including English Translation).
Anonymous, Compiled Redacted Correspondence regarding Tso '327 Reference, 2010.
Compiled Plaintiff's Response to Defendant's Initial Invalidity Contentions and Defendant's Initial Invalidity Contentions exchanged in NDIL Case No. 1:10-cv-04387 (Dec. 2010).

* cited by examiner

Subject: Re: Airport Delay
   Date: Thu, 4 Mar 1999 18:53:35-0800
   From: "Dr. Jones" <Djones@cellphone.com>
     To : "Mrs. Jones" <Mjones@home.com>
References: 1

Instructions:
   Please click on the "play" button to hear the voice message Reply From: Dr. Jones. You may send a reply text message if you wish by clicking "reply" on your e-mail program.

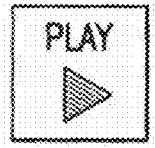 vmail.wav

Name: vmail.wav
Type: WAV (audio/wav)
Encoding: base 64

"Mrs Jones" wrote:
   I understand that you missed your flight again but when will you be home?

FIG.8

```
Subject: Call list Pass code: 123456
   Date: Thu, Mar 22 1999
   From: "Dr. Jones" <Djones@homePC.com>
     To: "Dr. Jones" <Djones@cellphone.com>

"Steve Smith" <Ssmith@anywhere.com>
        "Mary Lee" <mLee@doghouse.com>
```

METHOD FOR INTEGRATING AUDIO AND VISUAL MESSAGING

CROSS REFERENCE TO RELATED APPLICATIONS

This non-provisional application claims priority to U.S. Provisional Application Ser. No. 60/126,939, filed Mar. 29, 1999, the contents of which are incorporated herein by reference, and also claims priority to U.S. Provisional Application Ser. No. 60/155,055, entitled, "System and Method for Integrating Audio and Visual Messaging", filed Sep. 21, 1999, the contents of which are incorporated herein by reference.

BACKGROUND OF THE INVENTION

1. Field of the Invention

The present invention relates in general to communication systems such as voice paging systems, cellular telephone systems, text paging systems, voice mail systems, and conventional land line telephone systems and, more specifically, to methods, systems and apparatus for non-real-time audio and visual messaging between two messaging devices wherein a communication device receives visual messages from a visual message originator device and transmits audio messages (e.g., voice messages) to the visual message originator device for playback.

2. Discussion of the Background

A conventional mobile communication device (MCD), such as a pager or a mobile telephone, can receive various types of messages. There are numeric pagers which receive only numbers such as a telephone numbers (i.e. 818-555-1212), and there are alpha/numeric pagers which can receive alpha/numeric messages (e.g., Please call me at 929-555-1212). Additionally, there are voice pagers which receive voice messages. In addition to receiving messages, pagers are often configured to transmit messages. An alpha/numeric pager may be configured to receive alpha/numeric messages from an Internet-based computer and to transmit to the Internet-based computer originator alpha/numeric reply messages. Similarly, a voice pager that receives voice messages from a telephone-based originator can be configured to transmit a voice message to a voice mail system for retrieval by the originator via a telephone. In short, alpha/numeric pagers are configured to transmit alpha/numeric reply messages and voice pagers are configured to transmit voice reply messages.

In the field of wireless messaging generally, numeric and alpha/numeric messaging is, by far, more bandwidth efficient than voice messaging. Radio spectrum is a dwindling resource and wireless messaging companies are increasingly sensitive to their bandwidth efficiencies. Better bandwidth utilization means more capacity on the system. More capacity equates to more customers. Hence, the wireless messaging industry has migrated from voice paging to alpha/numeric paging in order to provide a bandwidth efficient, robust and high information content messaging service for their so called "road warrior" customers.

However, to date, there is no simple method for sending a message containing more than a small amount of information from an alpha/numeric pager. Generally, alpha/numeric pagers that have the ability to send messages are configured to transmit small, preprogrammed ("canned") text messages, such as "I will call you tonight" or "yes" or "no" or "I will reply later." Other alpha/numeric pagers have been configured with a miniature, QWERTY type, text keyboard. The miniature keyboards are difficult to type on because of their size. This makes input very slow, inaccurate and very annoying to operate. Additionally, the miniature size of the keyboard is still too large for a pocket-sized pager.

Audio pagers are generally larger than keyboardless alpha/numeric pagers, in part because of the large speaker required in order to reproduce a high quality, audible audio message. An audio pager's battery life is lower than an alpha/numeric pager due to the amount of time it takes to receive a message and the amount of power required to process and play the message.

One solution to the above problem is to route a mobile telephone originated voice reply message to a computer. However, it's simply not convenient to send a voice message via a mobile telephone, configure a computer to receive a voice reply message and then mentally correlate the sent and received messages together (i.e. Was the reply "sounds good to me" meant to be an answer to the message, "I will pay $140,000.00 for your home" or "lets have lunch tomorrow at the fish place").

A need, therefore, exists to blend audio (e.g., voice) and visual (e.g., text and/or graphics) messaging in a manner that conserves valuable bandwidth and simplifies user input of messages in a mobile communication device. An attempt to that end, is the so-called "smart phone." Smart Phones are wireless mobile telephones that have added features, implying that they are smarter than the average telephone. These features may include a numeric and alpha/numeric messaging feature, a personal digital assistant (PDA), computer functions, Internet access, and a miniature keyboard. Similar to an alpha/numeric pager, many mobile telephones today are capable of receiving alpha/numeric messages and have the capability of connecting to the Internet for sending alpha/numeric reply messages via a miniature keyboard. There is a need to simplify the input of reply messages into wireless devices for delivery of the reply messages to the originating device, wherein both messages may be correlated.

In an alpha/numeric pager messaging environment; text messages are routinely exchanged between a computer and a text pager (i.e. text in/text out). In a voice pager messaging environment, voice messages are routinely exchanged between a telephone configured voice mail system and a voice pager (i.e. voice in/voice out). In a mobile telephone messaging environment, as with an alpha/numeric pager, text messages routinely are exchanged in non real-time (i.e. text in/text out). However, mobile telephones also have the ability to make and receive real-time voice calls. More often than not, when a mobile telephone user receives a text message requiring some type of response, he or she will simply use the mobile telephone to place a real-time telephone call to the message originator. In many cases, the line is busy because the originator is either on the phone or connected to the Internet. In either case, the mobile caller is diverted to a voice mail system or answering device and is instructed to leave a message, which is then retrieved by the called person at a later time.

Many people prefer to communicate by messaging as opposed to real-time conversation in order to manage their time. Thus, there is a need for a device that can not only send non real-time text messages, but also receive non real-time voice messages (i.e. text out/voice in). At the wireless side of the messaging loop, there is a need to send non real-time voice messages from the same mobile device that receives non real-time text messages (i.e. text in/voice out).

It is widely accepted in the field of two way paging, that only a fraction of received messages generate a reply message response. On the other hand, when text message reception capability is combined with a mobile telephone, the mobile telephone user will attempt to reply much more often via a real-time voice call. Mobile telephone companies call this process "call completion" and it is highly favored among mobile telephone companies because additional calling generates more revenue. There is a need to increase reply traffic in a wireless environment without decreasing the efficiency of text message delivery to a mobile communication device. There is also a need to simplify the input of messages in a mobile communication device, such as a pager or wireless mobile telephone. Finally, there is a need for a wireless messaging system that provides end to end audio and visual messaging, wherein only one device is required at each end of the messaging loop (e.g., computer on the one end and mobile communication device on the other).

SUMMARY OF THE INVENTION

The present invention provides a communication system for integrating audio and visual messaging. The communication system includes a communication device for receiving visual messages and for transmitting voice messages to a recipient, and an integrated mail gateway for receiving from the communication device a voice message and addressing information. The integrated mail gateway is programmed to create an electronic mail (hereinafter "e-mail") message comprising the voice message. The integrated mail gateway is also programmed to use the addressing information to address the e-mail message, and to send the addressed e-mail message to the recipient.

Preferably, the communication device is a wireless mobile communication device. However, this is not a requirement. The present invention is contemplated to be used with wireless as well as non-wireless communication devices.

In one embodiment, the communication system is used by a user of a communication device to send a voice message in reply to a received visual message. For example, consider the situation where a first person uses a messaging device with Internet e-mail capability to transmit a visual message to a second person. The communication system of the present invention enables the second person to easily transmit a voice reply message to the first user's messaging to device. In one embodiment, the second person uses a communication device (such as a conventional telephone or mobile telephone having visual message reception capability) to establish a telephone call with an integrated mail gateway (IMG) that preferably has access to the visual message sent to the second person. After the telephone call is established, the second person uses the communication device to transmit, or the communication device automatically transmits, to the IMG addressing information associated with the visual message received from the first person. For example, a keypad on the communication device could be used to transmit the addressing information, or a processor in the communication device can be programmed to automatically transmit the addressing information. In one embodiment, after the IMG receives the addressing information, it prompts the second user to begin speaking a voice reply message for the first person after hearing a tone. The IMG records and stores the voice reply message. Optionally, the IMG will format the voice reply message into a conventional audio file format. The IMG then creates an e-mail message and includes the voice reply message in the e-mail. Optionally, the e-mail message includes at least part of the received visual message to which the voice message is a reply. The IMG uses the addressing information provided by the mobile communication device to address the e-mail message. After the e-mail message has been addressed, the e-mail message can be sent to the first user. Upon receiving the e-mail message, the first user's messaging device can play the voice reply message associated with the original visual message so that the voice reply message is heard by the first user.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

FIG. 8 illustrates an example of a reply message received and displayed by a messaging device.

FIG. 9 illustrates an exemplary address list message.

DESCRIPTION OF THE PREFERRED EMBODIMENTS

Figure 1:
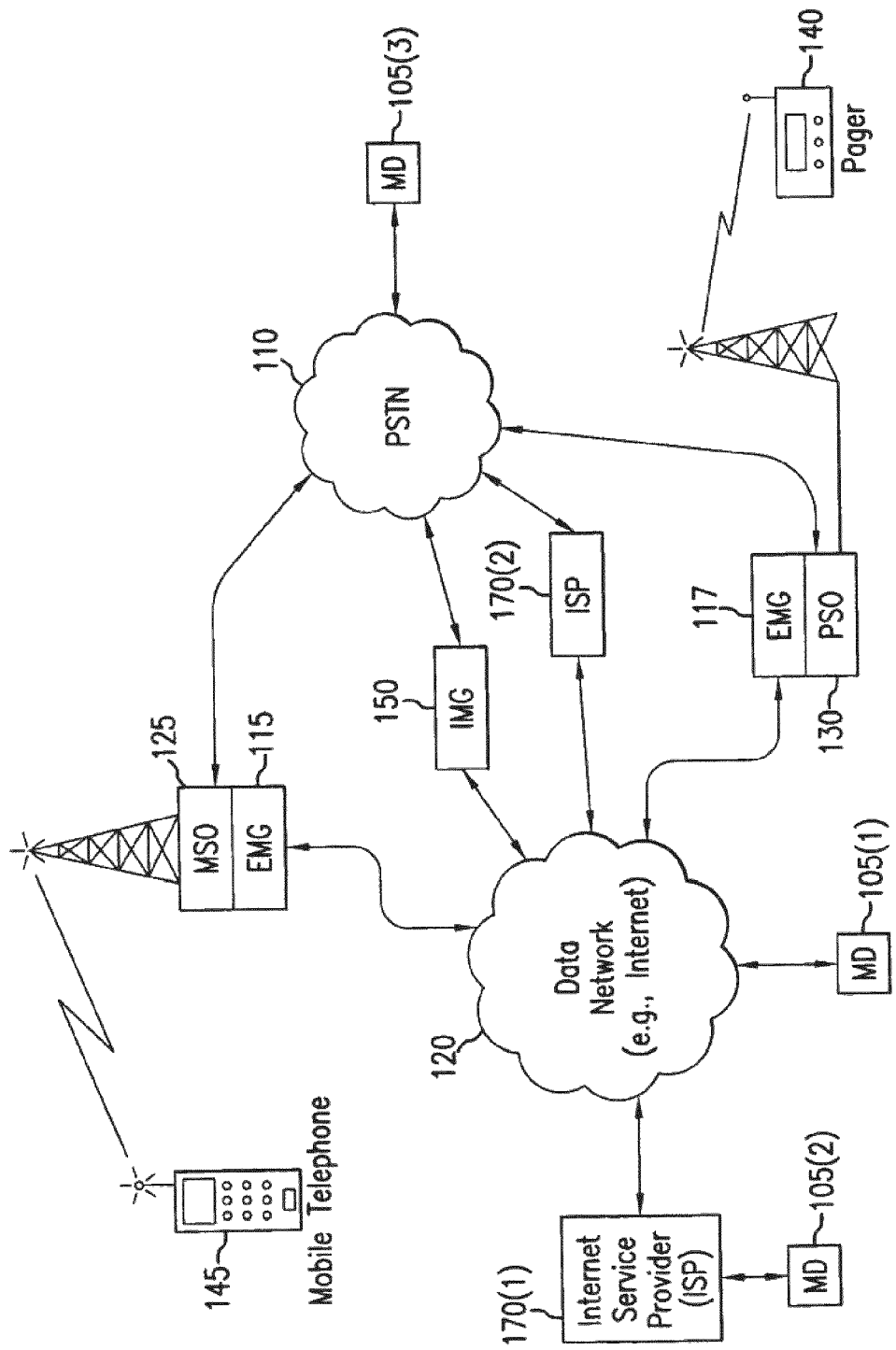
FIG. 1 is a schematic illustration of a communication system according to the present invention.

A first embodiment of the present invention is hereinafter described, with reference to the diagram of FIG. 1. FIG. 1 illustrates two mobile communication devices, a paging transceiver 140 and mobile telephone 145, for communicating with messaging devices 105(1), 105(2), and 105(3), collectively referred to as messaging device 105. More specifically, the paging transceiver 140 and mobile telephone 145 are configured for receiving visual messages from and transmitting audio messages to the messaging device 105. Visual messages include such messages as text messages (i.e. alpha/numeric messages) and graphic messages, which can include text and graphic images. A messaging device is a device having the ability to send and receive visual messages. An example of a messaging device is a personal computer configured with e-mail software and a connection to the Internet. Messaging devices are well known to those skilled in the art of computers and communications.

Preferably, messaging device 105 is directly connected to a data network 120 (such as the Internet or other like network) or connected to an internet service provider (ISP) 170(1) or 170(2) (such as America Online) that has a connection to data network 120. ISP 170(1) and 170(2) each has a point of presence including data storage and retrieval equipment for enabling e-mail services and file transfer as is well know to those skilled in the art of internet communications. Messaging device 105(3) is shown connecting to ISP 170(2) through PSTN 110. Although this is the most common way today for messaging devices to connect to an ISP, other connectivity options are available, such as satellite links and cable modems. Messaging device 105 is enabled for two-way e-mail and file transfer communications. Data network 120 is a communications network for transporting data. There are no limits to the type of data carried by data network 120. For example, the data can be simple text data or it can be voice or video.

An integrated message gateway (IMG) 150, is connected to a public switched telephone network (PSTN) 110 for automated storage and forwarding of audio messages. Operation of the IMG 150 will be described in detail hereinafter.

A Mobile Switching Office (MSO) 125 (also referred to as a base station) comprises all of the necessary equipment and software for enabling communications between mobile telephone 145 and PSTN 110 as well as data network 120. The MSO 125 and mobile telephone 145 are configured for voice communications and visual messaging. Other than the improvements to be described in detail hereinafter, the MSO 125 and mobile telephone 145 components are readily available and are well known to those skilled in the art of mobile telephone communications. The mobile telephone system described herein may be configured to operate using various format technologies well known in the art of mobile telephone systems such as for example, CDMA, TDMA, GSM, N-AMPS, etc.

A Pager Switching Office (PSO) 130 (also referred to as a base station), comprises all of the necessary equipment and software for enabling communications between a paging transceiver 140 and the PSTN 110 or the data network 120. The PSO 130 and paging transceiver 140 are configured for voice messaging from the paging transceiver 140 to the PSO 130 and for visual messaging from the PSO 130 to the paging transceiver 140. Visual messaging is well known to those skilled in the art of paging systems. Paging systems capable of transmitting visual messages may be purchased from Motorola, a U.S. manufacturer of paging equipment. Voice paging systems are also well known to those skilled in the art of paging systems. Motorola manufacturers paging systems for transmitting voice messages to voice pagers. Readycom of Chapel Hill, N.C. produces a system for transmitting voice messages to cellular voice pagers and for transmitting voice messages from cellular voice pagers.

Other than the improvements to be described in detail hereinafter, the PSO 130 and paging transceiver 140 components are readily available and are well known to those skilled in the art of paging communications. The paging system described herein may be configured to operate using various format technologies well known to those skilled in the art of mobile telephone systems and paging systems, such as for example Inflection, pACT, TDMA, etc.

In operation, a user (not shown) enters an e-mail message via a keyboard (not shown) attached to messaging device 105. The e-mail message is addressed to one or more communication devices, such as paging transceiver 140 and/or a mobile telephone 145. The e-mail message is routed through the data network 120 to MSO 125 or PSO 130 for transmission to the designated communication device(s).

The mobile communication device receives/retrieves and stores the e-mail message and, optionally, alerts the user that a message has been received. The user may view the message from a display screen on the communication device. In order to reply to the e-mail message, the user simply activates a reply command (e.g., the user can press a "reply" button or select a "reply" menu option) and then speaks a voice message into the mobile communication device microphone (not shown). The voice message and addressing data are transmitted to the wireless system operator (i.e., MSO 125 or PSO 130) and forwarded to the IMG 150. The IMG 150 formats the voice message into an acceptable messaging file format. It then creates an e-mail message with the formatted voice message attached thereto. Optionally, part or all of the received visual message is included in the e-mail message, thus providing the e-mail originator with a means to easily identify the message to which the voice message is a reply. The e-mail message is then sent to the ISP 170(1) for retrieval by messaging device 105(2) or is sent directly to messaging device 105(1). The user of messaging device 105 then listens to the formatted voice message using an audio system.

The process of sending an e-mail message from a messaging device 105 to a mobile communication device is well known to those skilled in the art of wireless visual messaging systems. However, the integration of audio and visual messaging presents novel features never before available to a wireless service company or end user. With the present invention, a cellular telephone company may now offer integrated (i.e., audio/visual) messaging services which are transported over the Internet, thereby achieving a substantial reduction in cost. Cellular telephone companies are offering e-mail type text messaging to mobile telephone subscribers today (through the Internet). In short, the cellular telephone company is already connected to the Internet. The present invention provides new opportunities for transporting non real-time voice messages over a network connection that would not be possible in real-time.

Figure 2A:
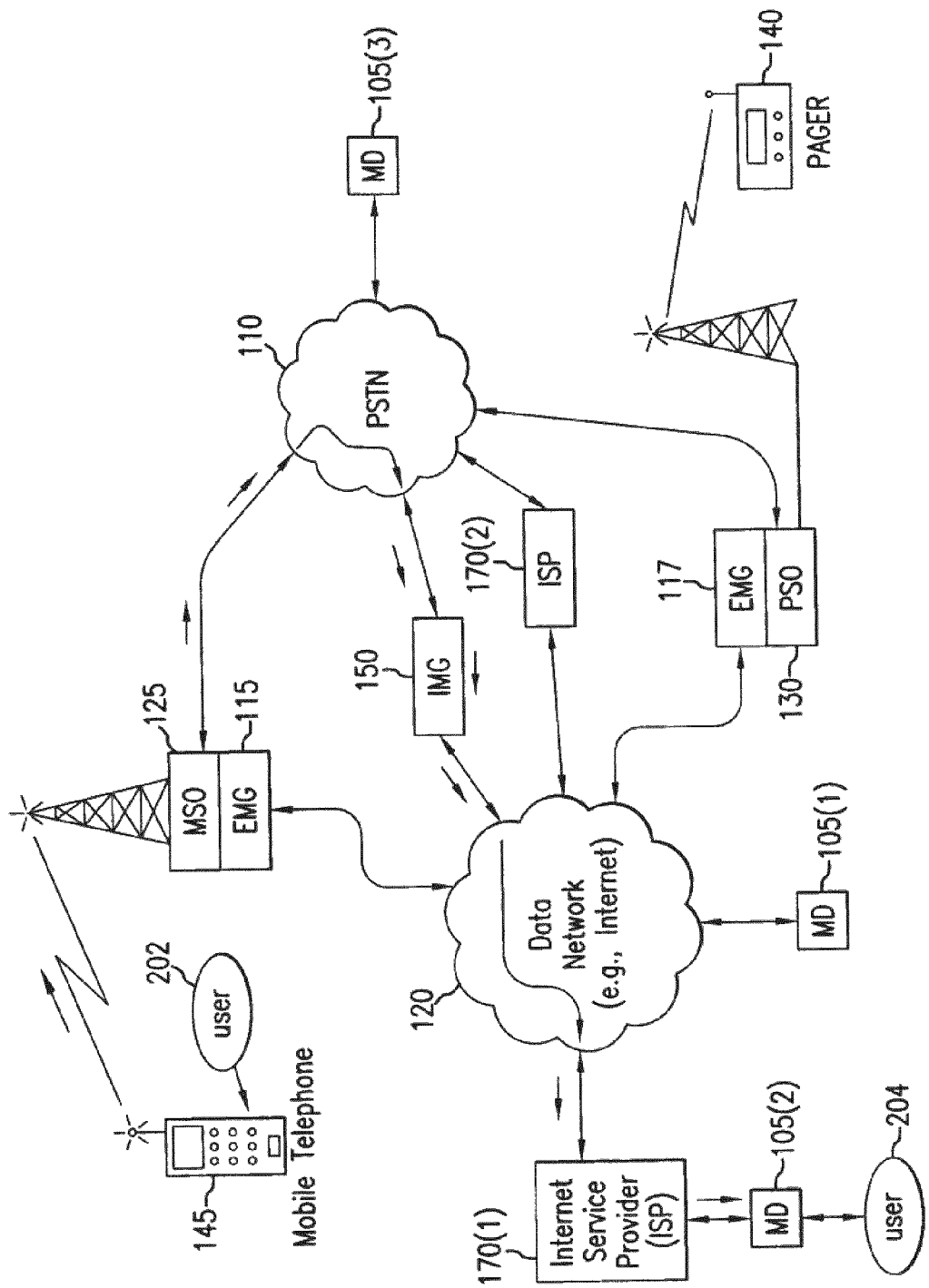
FIGS. 2A-2D are diagrams of a routing map illustrating a voice message path from a mobile communication device to a messaging device.

Referring to FIG. 2A, there is shown a routing map illustrating a voice message path from a mobile telephone 145 to messaging device 105(2), wherein a remote IMG 150 is configured for dial up service and located between the data network 120 and the PSTN 110. A mobile user 202 speaks a voice message into the mobile telephone 145. The voice message is transmitted to the MSO 125 and routed through the PSTN 110 to the IMG 150. The IMG 150 stores and formats the voice message and sends it as an e-mail through the data network 120 to ISP 170(1). Messaging device 105(2) retrieves the voice message from service provider 170(1), and the voice message is played back on the messaging device 105(2) to a user 204.

Figure 2B:
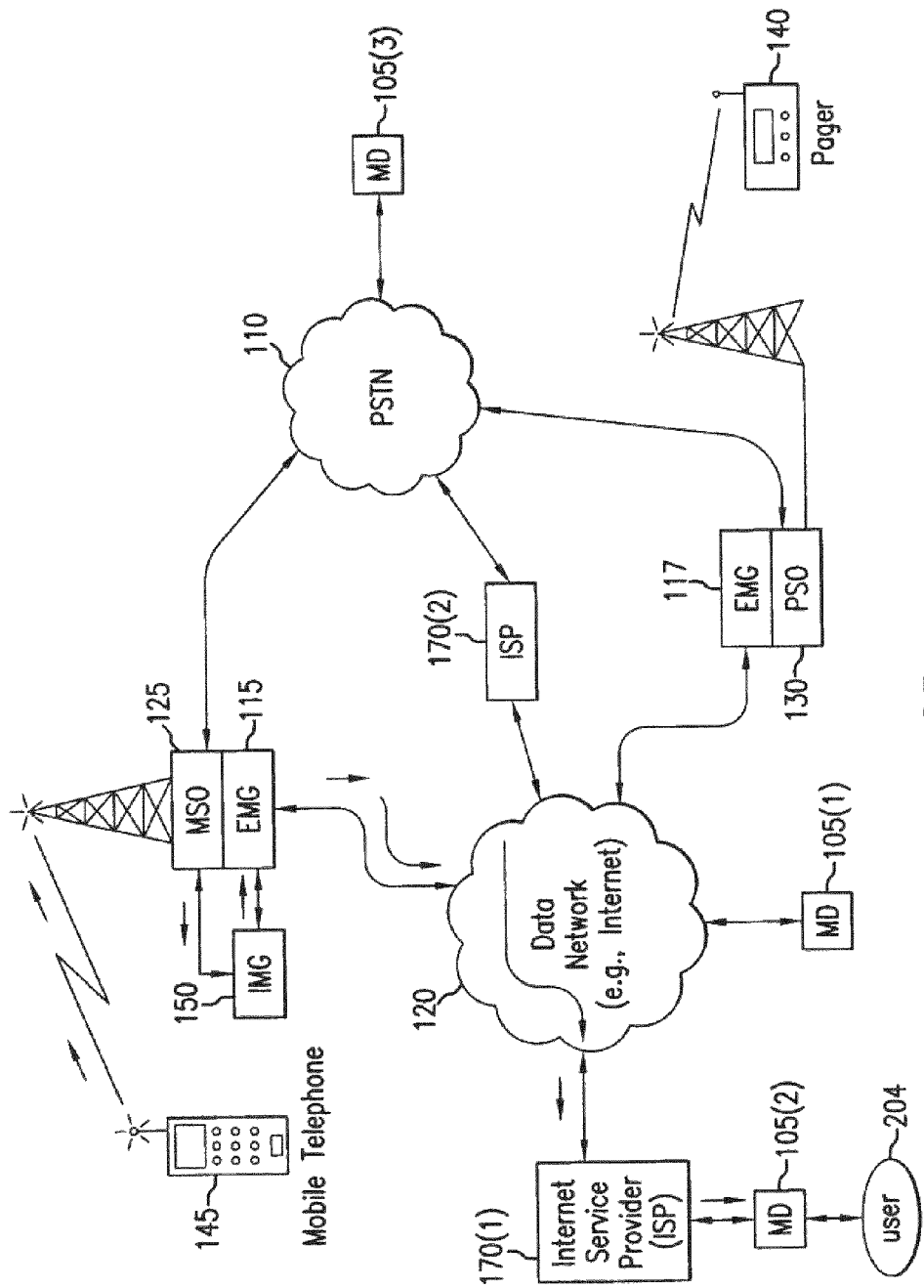

Referring to FIG. 2B, there is shown a routing map illustrating a voice message path from a mobile telephone 145 to messaging device 105(2) wherein IMG 150 is privately connected to the MSO 125. The mobile user 202 speaks a voice message into the mobile telephone 145. The voice message is transmitted to the MSO 125 and routed to the IMG 150. The IMG 150 stores and formats the voice message and sends it as an e-mail through the data network 120 to ISP 170(1). Preferably, IMG 150 uses data network 120 to send the voice message to service provider 170(1). However, one skilled in the art will appreciate that IMG 150 can have a direct connection to service provider 170(1), thereby bypassing data network 120. Messaging device 105(2) retrieves the voice message from service provider 170(1), and the voice message is played back on the messaging device 105(2) to the user 204.

Figure 2C:
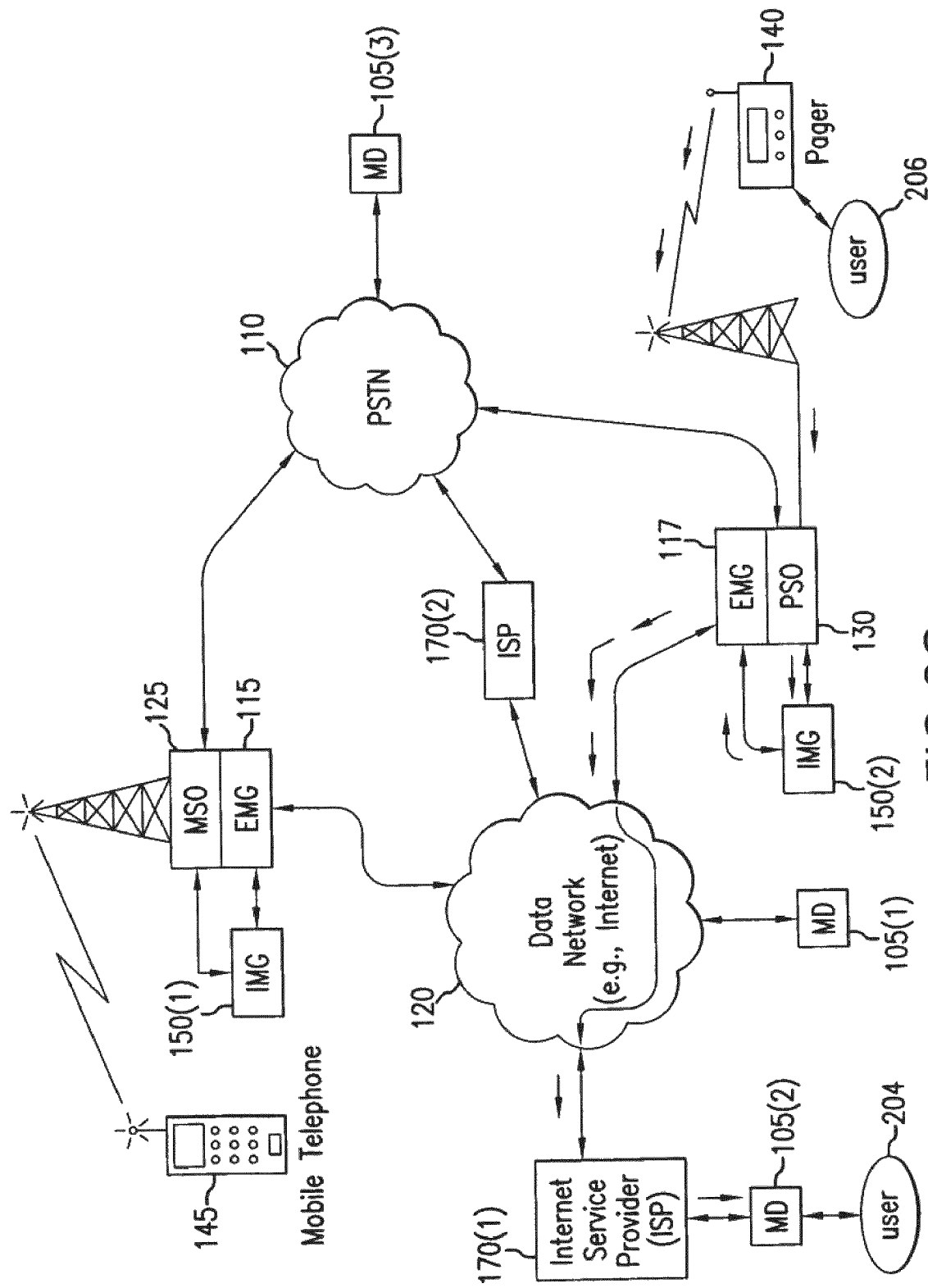

Referring now to FIG. 2C, there is shown a routing map illustrating a voice message path from paging transceiver 140 to messaging device 105(2), wherein an IMG 150(2) is directly coupled with the PSO 130 and interfaced to the PSO 130 e-mail network system. A pager user 206 speaks a voice message into the paging transceiver 140. The voice message is then stored in the paging transceiver. The stored voice message is transmitted to the PSO 130 using a paging protocol and routed to the IMG 150(2). The IMG 150(2) stores and formats the voice message and sends it as an e-mail through the data network 120 to ISP 170(1). The message is then retrieved and played by the messaging device 105(2).

Figure 2D:
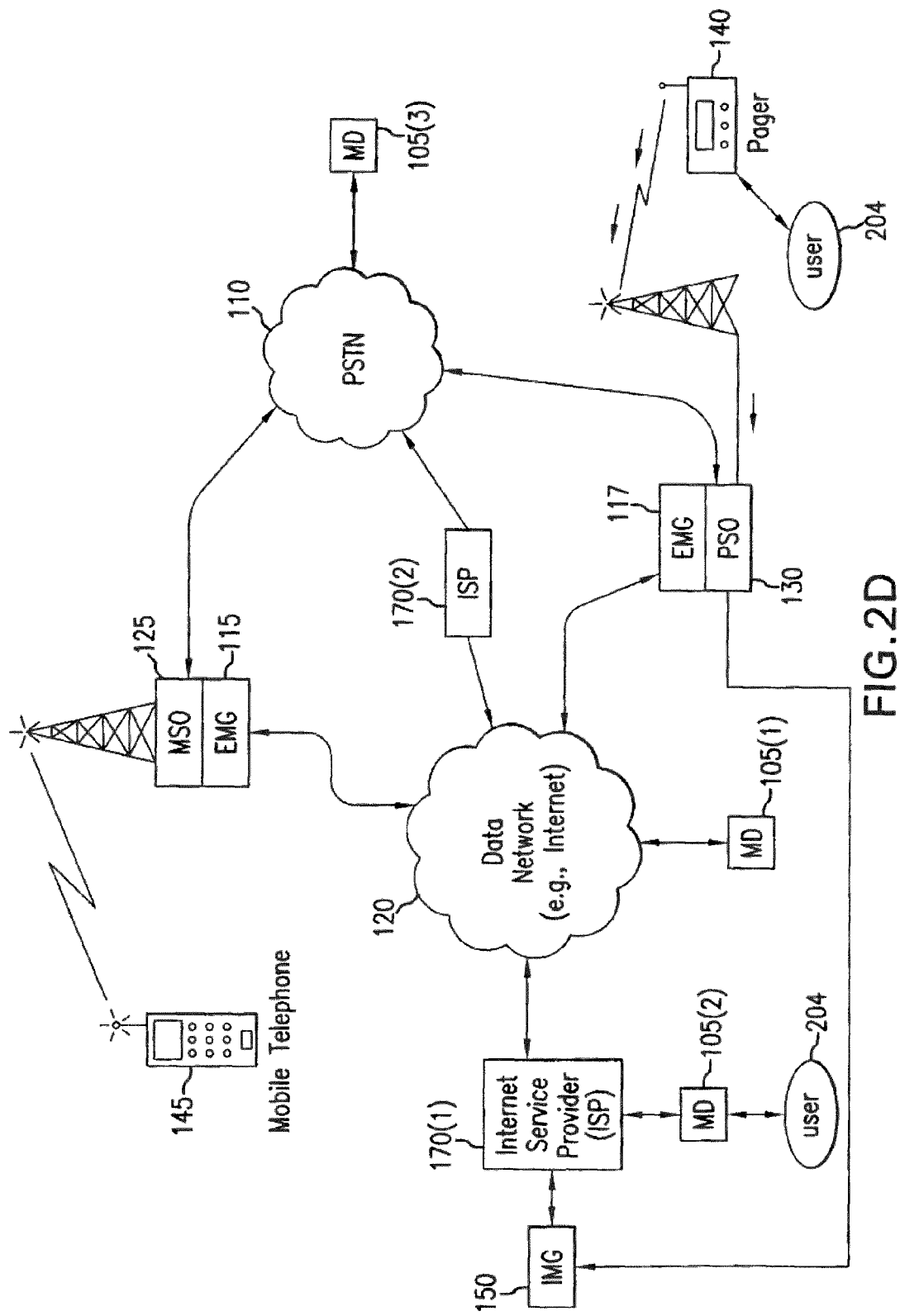

Referring to FIG. 2D, there is shown a routing map illustrating a voice message path from paging transceiver 140 to messaging device 105(2), wherein an IMG 150 is privately networked to ISP 170(1). A pager user 206 speaks a voice message into the paging transceiver 140. The voice message is transmitted to the PSO 130 and routed to a IMG 150 where the voice message is formatted and sent via the ISP 170(1) and continues as previously described.

As illustrated above, a voice message may be routed from a mobile communication device 140, 145 to a messaging device 105 utilizing a variety of message routing designs. It is important to note that the voice message may be routed through one particular path while a visual message may be routed through a different path. For example, a text e-mail message may be routed from the messaging device 105(1) through the data network 120 to an e-mail server and short messaging service at the MSO 125. From the MSO 125, the visual e-mail text message is transmitted to the mobile telephone 145. The e-mail message is viewed by the user and the user speaks a voice reply message to be delivered back to the message originator at the messaging device 105(1). The voice message is then routed to the messaging device 105(1) through one of, or a variation of, the routes previously described. The system operator is given the option to choose a two-way messaging system for voice and visual messaging that utilizes the most efficient delivery path for touting messages depending on the type of message to be delivered or received (i.e. audio or visual). An MSO 125 or PSO 130 may now utilize the data network 120 for transporting voice messages.

Prior art systems currently exist for sending e-mail text messages from a computer over the Internet to a mobile communication device. The present invention enables a mobile communication device to send a voice reply message over the Internet (or other data network) to the user that originated the e-mail text message. This is a highly desirable feature. For example, consider a mobile device user who is driving a car and receives an e-mail message to which a reply is urgently required. Such a user is unable to safely use a keyboard to enter a text reply message, but can easily create a voice reply message while keeping his or her hands on the wheel.

Figure 3:
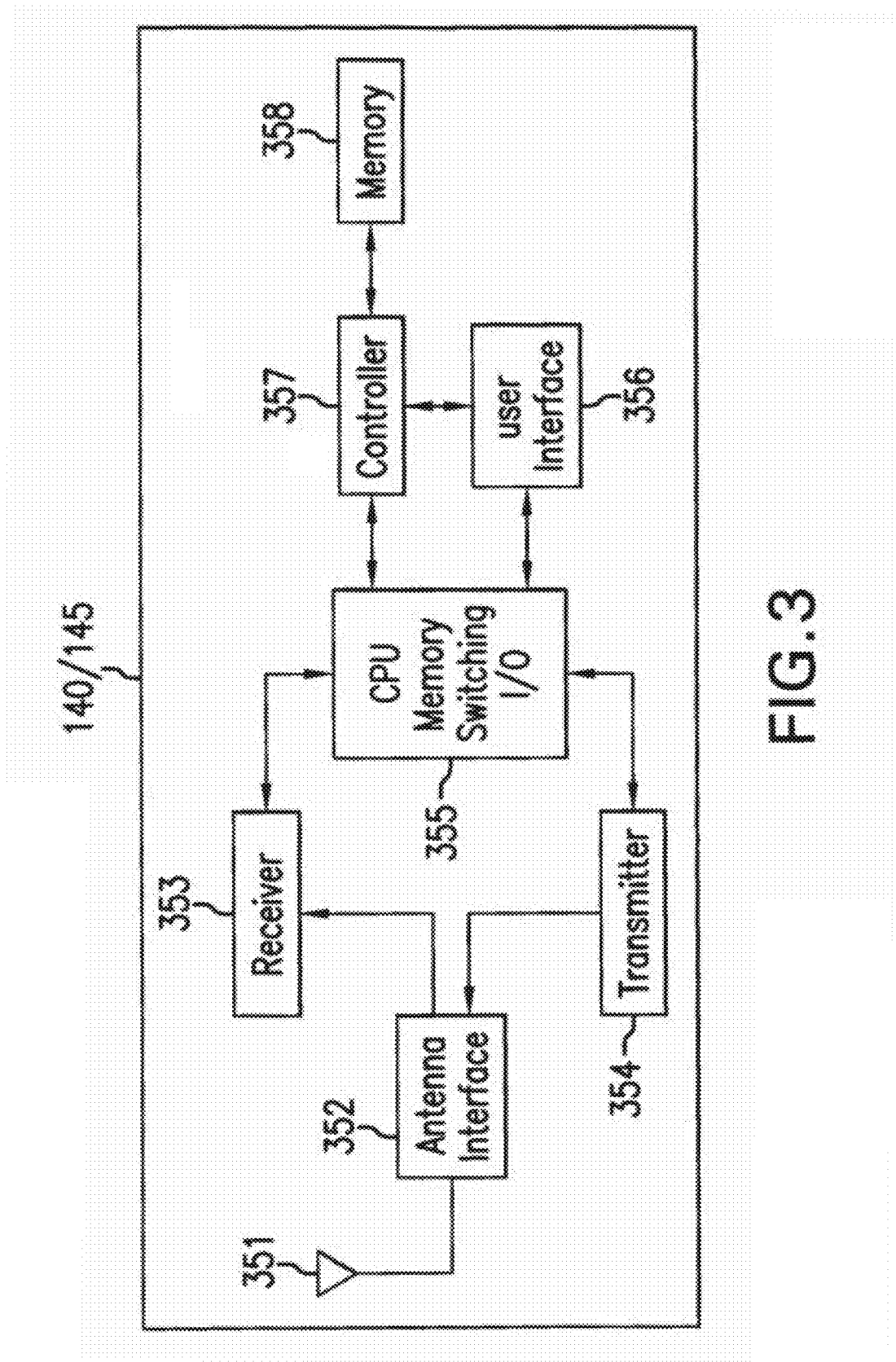
FIG. 3 illustrates in block form a mobile communication device according to the present invention.

Referring to FIG. 3, a mobile communication device, such as a mobile telephone 145 or a paging transceiver 140, according to one embodiment is shown in block form. An antenna 351 connects to an antenna interface 352. The antenna interface 352 may be a duplexer or equivalent device depending on the type of mobile communication device desired. An antenna switch, for example, may be utilized for configuration as a paging transceiver 140 or two antennas might be used, thereby eliminating the requirement for a duplexer. A receiver 353 and a transmitter 354 are connected to the antenna interface 352 and processing module 355. The processing module 355 includes a microprocessor, RAM and ROM memory, switching, and I/O ports.

The necessary software instructions and operating system for enabling mobile telephone 145 or paging transceiver 140 to receive visual messages are included and well known to those skilled in the art of mobile telephone and paging systems. Mobile telephones for two-way voice communications are commonly available today. Many of these mobile telephones receive and display visual messages such as text messages. Generally, this service is called Short Messaging Service or SMS.

One format for receiving SMS is known as Cellular Digital Packet Data or CDPD. There are many variations for text messaging in mobile telephones and there are many formats in which the text messages may be transmitted. A few mobile telephone types that receive text messaging are CDMA (Code Division Multiple Access), TDMA (Time Division Multiple Access), and GSM (Global System for Mobile Communications). There are also a plurality of languages and protocols for enabling a wireless mobile telephone to communicate over the Internet. A few of them are HDML (Handheld Device Mark up Language), HDTP (Handheld Device Transport Protocol), TTML (Tagged Text Mark up Language) and WAP (Wireless Application Protocol).

There are many prior art configurations for receiving visual messages by mobile telephone 145 or paging transceiver 140, and all such configurations are herein contemplated for use in combination with the novel features of the present invention. In short, it is widely known in the art of wireless paging systems and mobile telephone systems that paging transceivers and mobile telephones receive visual messages.

The process by which a visual message, such as text, is received is not critical. However, the novel system and method for processing the received message information in connection with transmitting a voice reply message will be described in detail hereinafter.

Referring again to FIG. 3, a user interface 356 connects to the processing module 355. The user interface 356 comprises all of the input and output devices for interaction with the mobile communication device such as speaker, alerting transducer, microphone, liquid crystal display (LCD) or light emitting diode (LED) display, switches, etc. These devices are normally included with a conventional mobile telephone having short messaging service features. In the case of the paging transceiver 140, a microphone is included in the user interface 356 for enabling speech input because a conventional paging transceiver for visual messaging does not have a microphone.

The antenna 351, antenna interface 352, receiver 353, transmitter 354, processing module 355 and user interface 356 are connected in a typical mobile telephone or paging transceiver configuration. A controller 357 and memory 358 have been included for processing of received visual messages, storage of visual messages, and processing of transmitted voice messages. The controller 357 comprises a conventional microprocessor of the type commonly used in mobile telephones and paging transceivers. The controller 357 also includes a memory manager, I/O ports, RAM and ROM memory and all necessary software instructions required to communicate with the processing module 355, user interface 356, and memory 358. The controller 357 connects to the processing module 355 for receiving and sending data, messages, and commands. The controller 357 is connected to memory 358 for storage and retrieval of messages and message data and to the user interface 356 for input and output interfacing with a user.

Continuing with FIG. 3, when a visual message is received by receiver 353, it is stored for reproduction by the processing module 355 in a conventional manner. The visual message may contain addressing data, identification data or other data corresponding to the visual message which is also stored. After the visual message is received, an alert may be generated for notifying a user that a message has been received. The user may then select a display message option provided by the user interface 356 to cause the stored visual message to be displayed on the user interface 356 LCD or LED display.

When a user wishes to send a voice message in reply to a received visual message, the user enables a voice reply mode via user interface 356. This causes the controller 357 to read the necessary addressing information from the processing module 355 and memory 358 for addressing and sending the voice reply message to the originator of the received message. Optionally, the user may enter addressing information associated with the received visual message manually using a keypad, as previously described. After enabling the voice reply mode, the user speaks into the microphone of the user interface 356, and a real-time voice message is transmitted to the IMG 150 for forwarding, in non real-time, to the visual message originator (e.g., messaging device 105). In an alternative embodiment of the present invention, a pre-recorded voice message is transmitted to the IMG 150 as will be described in detail hereinafter.

When a mobile communication device receives a visual message, the mobile communication device also receives and stores messaging data associated with the visual message. This messaging data may include, but is not limited to: a reply name, a reply address, a reply code, a reply type code, and reply subject matter.

The reply name is generally the name of the person who sent the visual message. The reply address may be an e-mail address such as "jsmith@hotmail.com" or an abbreviated address such as a sequence of letters and/or numbers that is associated with an e-mail address stored at the IMG 150. The reply address may also include an IMG 150 system identifier or e-mail system identifier or a telephone number to a particular IMG 150. The reply code is a code that corresponds to the original visual message stored at the MSO's 125 or PSO's 130 e-mail system or at IMG 150. The reply type code indicates the type of voice message that is allowable by the system (i.e. pre-recorded, real-time, analog, digital, format, etc.). The type code may also indicate the allowable length or size of a voice Message. The reply subject matter may contain to the original text subject matter of the received visual message.

A complete system according to the preferred embodiment of the present invention will now be described in connection with the mobile telephone 145 and the MSO 125 system of FIG. 2B. The mobile telephone 145 is enabled to receive visual messages from the MSO 125 using any number of methods previously described. The system may operate in any number of formats including CDMA, TDMA, GSM, etc. Short messaging service (SMS) for sending text messages to a mobile telephone is well known to those skilled in the art of mobile telephone systems. Other methods for delivering visual messages are also very common. For example, a modem could be added to an analog mobile telephone or tone signaling could be used for transmitting text from the MSO 125 to the mobile telephone 145. The use of CDPD is also quite common in the art of mobile telephone systems.

In order to send a visual message from the messaging device 105 to the mobile telephone 145, a user of messaging device 105 creates an e-mail message using an e-mail program, such as one provided from AOL, Lotus, Netscape or Microsoft. The e-mail message is sent from the messaging device 105 to the MSO 125 via data network 120. An e-mail gateway (EMG) 115 is configured at the MSO 125 for receiving the e-mail message for delivery to the mobile telephone 145. Such a configuration is well known to those skilled in the art of mobile telephone systems.

After the e-mail message is received by the EMG 115, the MSO 125 transmits a signal to the mobile telephone 145. The signal includes the e-mail message and messaging data associated with the e-mail message. For this example, the signal consists of a reply name of "John Doe," a reply code, and the e-mail message, as shown below:

From: John Doe
To: Mary Jane
Subject: Airport Delay
Reply code: 12
Mary,
My Flight is Delayed. I now arrive at 10:00 p.m., Flt. 2216.

The reply code is a code that is associated with the e-mail message stored in EMG 115. The reply code may be any sequence of numbers or characters, such as: 12 or 123ABC. Each message stored in the EMG 115 has a unique reply code associated with it.

The antenna 351 of mobile telephone 145 receives the signal sent from the MSO 125. The receiver 353 demodulates the signal to recover the e-mail message and message data contained in the signal. The processing module 355 stores the e-mail message and message data in memory and causes the user interface 356 to alert the user that a message has arrived.

Upon being alerted, the user may activate the user interface 356 to cause the processor 355 to read the stored visual message and associated messaging data from the memory and display it on a display screen for viewing by the user. The time at which the message was sent or delivered may also be displayed on the display screen. Additionally, a reply indicator, which is triggered by the reply code and gives an indication to the user that the visual message selected is one in which a voice reply may be sent, is displayed. After viewing the displayed information, the user makes a decision to send a voice reply message to the originator by selecting a reply option provided by the user interface.

Figure 4:
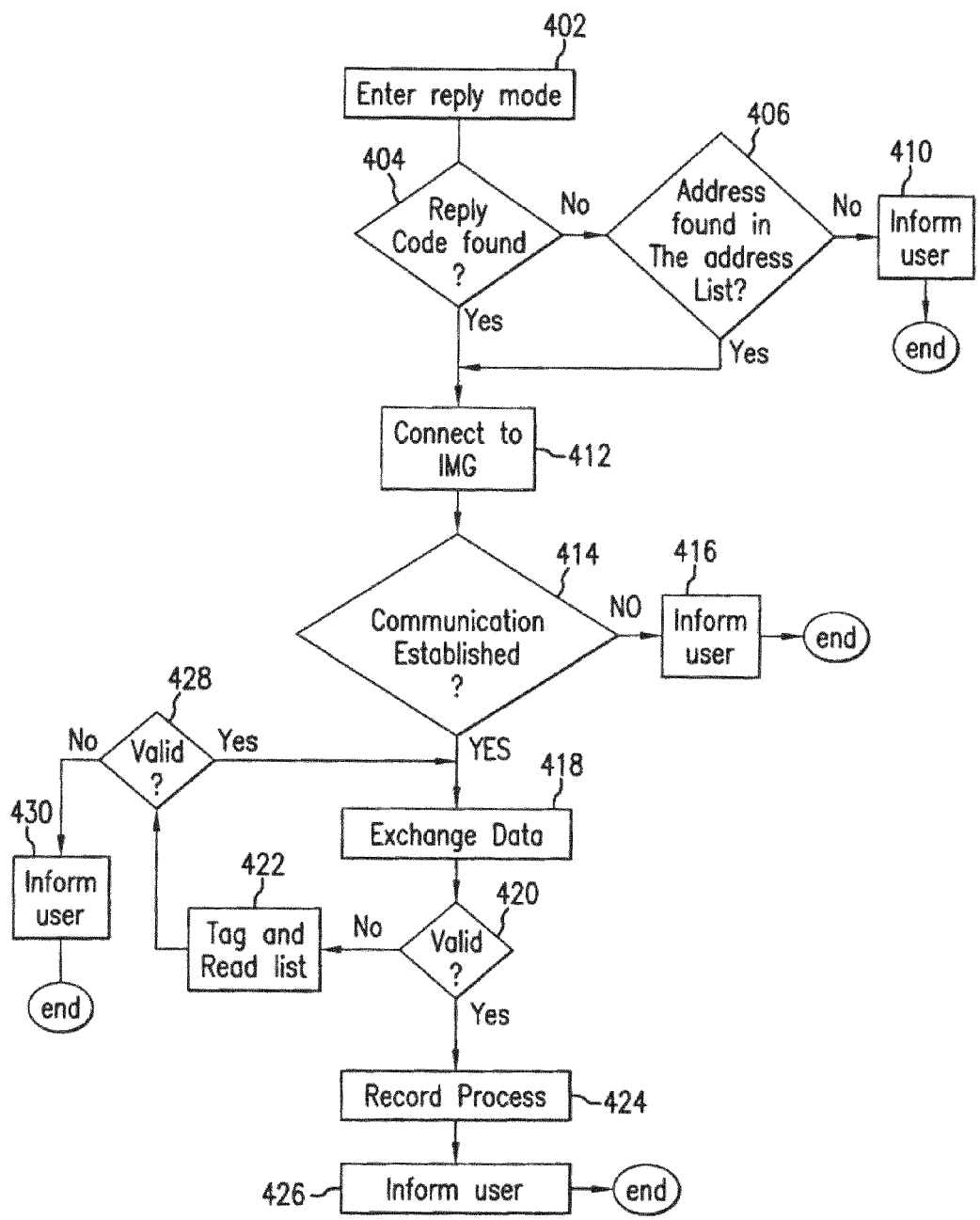
FIG. 4 is a flow diagram of a process for sending a voice reply message according to the present invention.

Referring now to FIG. 4, there is illustrated a process performed by the controller 357 for sending a voice reply message. The process begins with step 402, where the controller 357 receives an indication that the user has selected a reply option from the user interface 356 and, thus, enters a reply mode. Flow proceeds to step 404, where the controller 357 reads the memory from processing module 355 for messaging data corresponding to the visual message to which the user desires to reply. A pre-programmed telephone number to the MSO 125 for connection to the IMG 150 is also read from memory 358 or obtained from the messaging data. The messaging data may or may not include a reply code. If the messaging data does not include a reply code, the process proceeds to step 406, otherwise the process proceeds to step 412.

In step 406, the controller 357 searches an electronic address book (hereafter "address book") stored in memory 358 for an address associated with the reply name that was included in the messaging data. If the controller 357 does not find such an address, then flow proceeds to step 410, otherwise flow proceeds to step 412. In step 410, the user is informed via a visual or audible indicator that there is no return address and the process ends.

It should be noted that the reply code search at step 404 was for a code that corresponds to the visual message stored at the MSO 125. If the reply code does not exist, the reply name included in the messaging data is used to search for a corresponding address. As previously described, the reply code might simply be the sequence "12". Reply codes reduce air time because all of the necessary addressing information is stored at the MSO 125 and the reply code points to that data.

In step 412, the controller 357 of mobile telephone 145 attempts to establish communications with the IMG 150 at the MSO 125 by sending the pre-programmed telephone number read from the memory 358 or obtained from the messaging data. This attempt is automatically accomplished by the controller 357. After step 412, flow proceeds to step 414, where a determination is made to see if communication is established. If communication is not established, flow proceeds to step 416, otherwise flow proceeds to step 418.

In step 416, the user is informed that a connection could not be established and the process ends. If this occurs, the user can simply attempt to send the reply message at a later time. In step 418, the mobile telephone transmits addressing data to the IMG 150, and the IMG 150 transmits acceptance or error codes back to the mobile telephone 145. The addressing data either includes the reply code or the address determined in step 406.

After step 418, flow proceeds to step 420, where the controller 357 checks for "invalid data" error messages sent from the IMG 150. If an invalid data error is detected, the controller 357 tags the invalid addressing data stored in the memory 358 as invalid and reads the memory 358 for valid messaging data in order to correct the problem. For example, if the mobile telephone 145 sends a reply code associated with a message that is no longer available to the IMG 150, the IMG 150 will send an error code to the mobile telephone 145 indicating that the message can not be replied to using the current reply code.

When the controller receives this error code it reads the memory 358, to see if there is a name and address for the recipient stored in memory 358 (step 422). If yes, at step 428, flow proceeds to step 418 and the process continues. If the controller 357 does not find valid addressing data, flow proceeds to step 430 where the user is informed of the problem via an indicator and the process ends.

If at step 420 it is determined that the addressing data is valid, flow proceeds to the message record process at step 424. At step 424, the mobile telephone 145 user is informed by the IMG 150 to begin speaking a message at the tone for the designated recipient. The mobile telephone user may also be informed via an LCD or any other means of indication to the user to begin speaking. The user may also be informed as to how much time the user may speak a voice message. For example, "begin speaking a 30 second message for Mary Jane at the tone." However, a preferred embodiment provides for a more efficient means for notifying a user of the amount of available record time. As previously discussed, a reply type code can be included in the messaging data transmitted with the visual message. The reply type code can include a length code indicating the amount of time allowable for a reply message. This feature can be very useful for a mobile telephone 145 user, in that the user is informed at the time the visual message is viewed, of the amount of time given to reply. This advanced notice gives the user time to compose a reply message in advance as opposed to finding out two seconds before recording starts.

At step 424, the voice message is recorded by the IMG 150 in a manner consistent with conventional voice mail systems well known to those skilled in the art of voice mail systems. For example, the user may be given the option to review the message, delete the message, re-record the message, etc. When the user is finished recording, flow proceeds to step 426, where the IMG 150 notifies the mobile telephone 145 user that the voice message has been accepted and or sent and the process ends.

As illustrated by the above process, a voice message may be sent as a reply message to a visual message. A number of schemes may be used to send the voice reply message to a messaging device 105 so that the messaging device 105 user knows that the voice message is a voice reply to a particular visual message: In one scheme, the mobile telephone 145 simply transmits a reply code to the IMG 150. The reply code corresponds to a particular visual message available to the IMG 150. For example, the visual message could be stored within the IMG 150, MSO 125 or EMG 115. When the IMG 150 formats the voice reply message, the IMG 150 can include in the reply message the particular visual message associated with the reply code.

In another scheme, if the visual message is not available to the IMG 150, the mobile telephone 145 searches its memory 358 for a name or address. If found, the name or address, together with the received visual message or part of the received visual message, is transmitted along with the voice message to the IMG 150, which will then create an e-mail message containing the voice message and the received visual message or part thereof. The name or address sent to the IMG 150 is used by the IMG 150 to address the e-mail message.

In short, if the visual message is available to the IMG 150, and the messaging data transmitted to the mobile telephone 145 includes a reply code, then there is no need for the mobile telephone 145 to transmit to the IMG 150 anything other than the voice message and the reply code, thereby saving valuable bandwidth.

Voice messages that are not reply messages may also be initiated by the mobile telephone 145. The mobile telephone user may simply select a pre-stored name or address from a name and address book (also referred to as, "send message list") stored in memory 358. When the name appears on the display screen, the user simply uses the user interface to select a send message function and the process starts at step 412, FIG. 4. The stored name or address is utilized for addressing the voice message and the process proceeds as previously described.

Voice messages transmitted from the mobile telephone 145 may be analog or digital. If analog transmission is utilized, the IMG 150 converts the analog voice message to digital data representative of the voice message for storage and transmission to the messaging device 105. If the voice message is in digital format, the digital data representative of the voice message may be stored directly by the IMG 150.

Additionally, a voice message may be pre-recorded and stored in memory 358 for transmission to the IMG 150. In such a configuration, a digital signal processor and associated analog to digital converter may also be configured with the controller 357 in a conventional manner for recording voice messages and storing the voice messages as data in memory 358. If the stored voice message is to be transmitted in analog format, then a digital to analog converter may also be utilized for converting the voice message data stored in memory 358 back to analog. For a pre-recorded voice message configuration, step 424 of FIG. 4 would be changed to: Recall the stored message from memory and transmit with associated addressing data. Optionally, the stored voice message my be compressed by conventional compression algorithms prior to being transmitted.

In connection with the paging transceiver 140, it should be noted that a telephone call is not normally initiated between a paging transceiver and the pager switching office (PSO) 300. In the case of paging transceiver 140 sending voice messages to the PSO 130, a pre-recorded voice message, as opposed to a real-time voice message, may be sent as previously described. However, at step 412, a telephone connection is not established. Step 412 would be changed to: Page PSO 130 utilizing a conventional voice paging protocol such as Inflection, pACT, etc. Step 414 would be changed to: Did the PSO 130 respond to the selective call (i.e. page and handshake). Finally, step 424 would be changed to: Transmit the pre-recorded voice message using a paging protocol. Optionally, prior to transmission, the pre-recorded voice message can be compressed using conventional compression algorithms to decrease air time.

Figure 5:
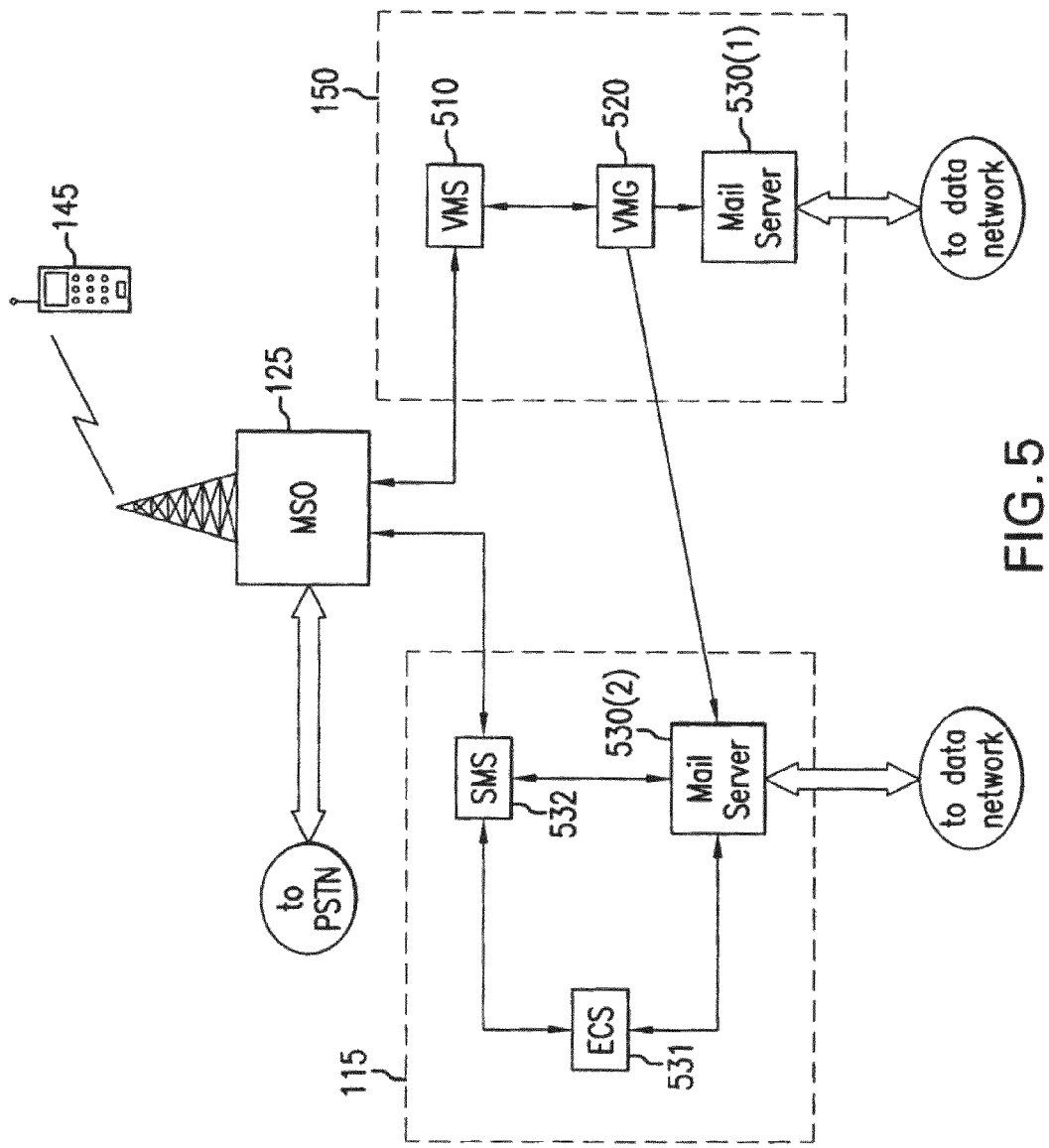
FIG. 5 is a schematic illustration of one embodiment of an integrated mail gateway and electronic mail gateway.

Referring now to FIG. 5, one embodiment of the IMG 150 and EMG 115 are shown. The IMG 150 comprises a voice mail system (VMS) 510 networked to a voice mail gateway (VMG) 520. The IMG 150 may also include a mail server 530(1). The EMG 115 includes a short messaging service (SMS) 532 and an e-mail conversion system (ECS) 531. The EMG 115 may also include a mail server 530(2). Optionally, the EMG 115 and IMG 150 can share the same mail server 530.

The mail server 530(2) is coupled to data network 120 and receives visual messages sent from messaging device 105. The ECS 531 retrieves visual messages from the mail server 530 and reformats the messages for wireless transmission. The ECS 531 sends the reformatted messages to the SMS 532 where it is queued and sent to the MSO 125 for transmission to a targeted mobile telephone 145. There are many formats and systems available for delivering e-mail messages to the MSO 125 or PSO 130 for transmission to a mobile telephone 145 or paging transceiver 140, respectively. These systems are well known to those skilled in the art of wireless messaging. Other than the improvement described hereinafter, these systems are readily available.

The VMS 510 is connected to the MSO 125 so that voice messages sent from mobile telephone 145 can be received and stored by the VMS 510. The VMS can be directly connected to the MSO 125 (as shown in FIG. 2B) or the VMS 510 can be connected to the MSO 125 through the PSTN 110.

The VMS 510 is an enhanced voice mail system. Voice mail systems are readily available from manufacturers such as Centigram Communications Corporation in San Jose, Calif., to Nortel Networks in Santa Clara, Calif. and AVT in Kirkland, Wash., to name a few. The VMG 520 is an enhanced voice mail gateway. Voice mail gateway systems are also readily available from the above manufacturers. Voice mail systems and voice mail gateways are generally software driven and adaptable to various messaging environments. These systems are easily networked for communication between different manufacturer's platforms. Additionally, these systems have evolved to the point that many have the capability of sharing messages and data between platforms. One such system manufacturer is Data Connection Limited in Enfield, England. Data Connection Limited manufactures voice mail systems, voice mail gateways and networking systems which will communicate utilizing a protocol called "Voice Profile for Internet Mail" (VPIM). The VPIM protocol is a common messaging language for the transport of voice messages between platforms. VPIM additionally allows for the sending of voice messages from a computer or voice mail system to a voice mail system or computer via the Internet. Other than the improvements described hereinafter, voice mail systems, voice mail gateways, voice mail networks, mail servers, e-mail gateways, short messaging service systems, MSO systems, protocols for transmitting voice messages over the Internet and protocols for transmitting e-mail messages to a wireless transceiver are well known to those skilled in the art of these systems and are readily available.

Figure 6A:
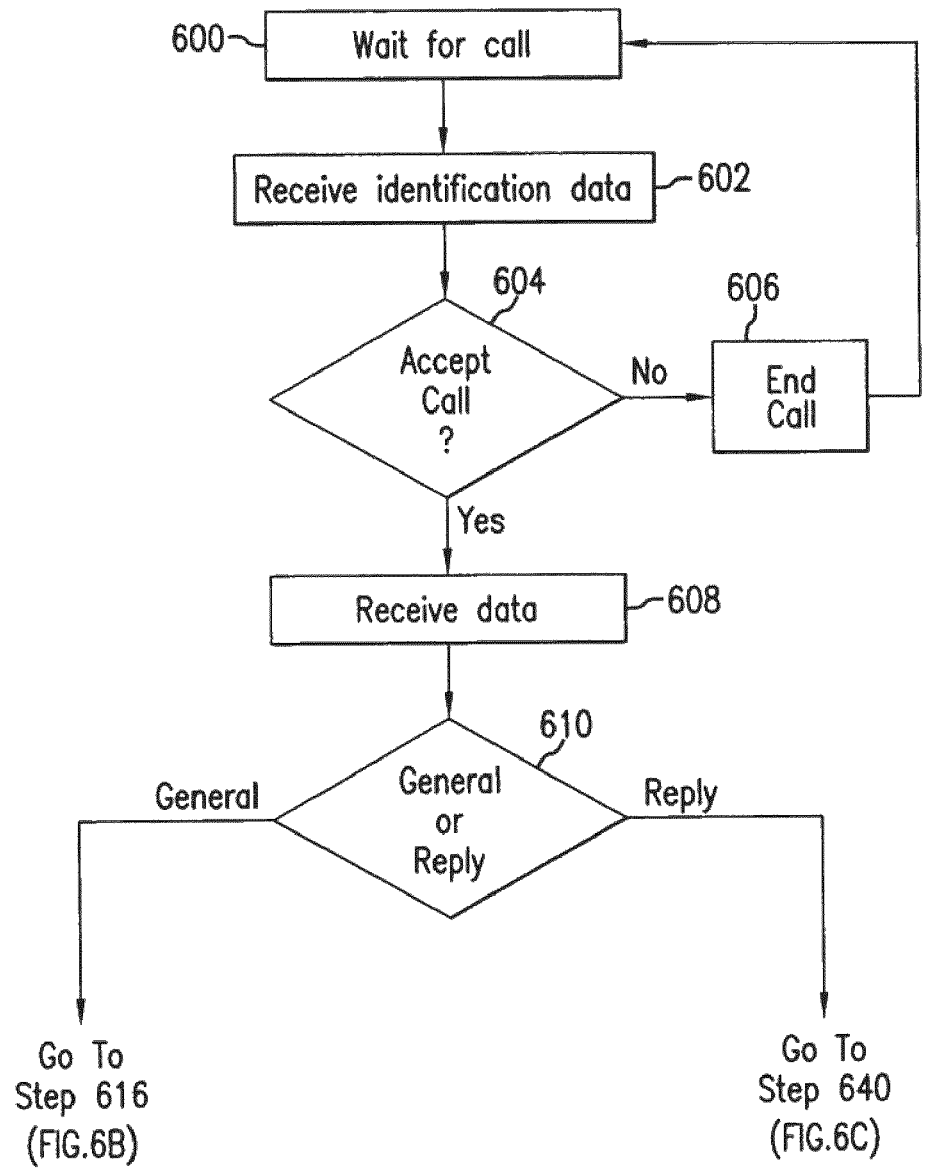
FIGS. 6A-6C are flow diagrams of a process for receiving voice messages from a mobile communication device.
Figure 6B:
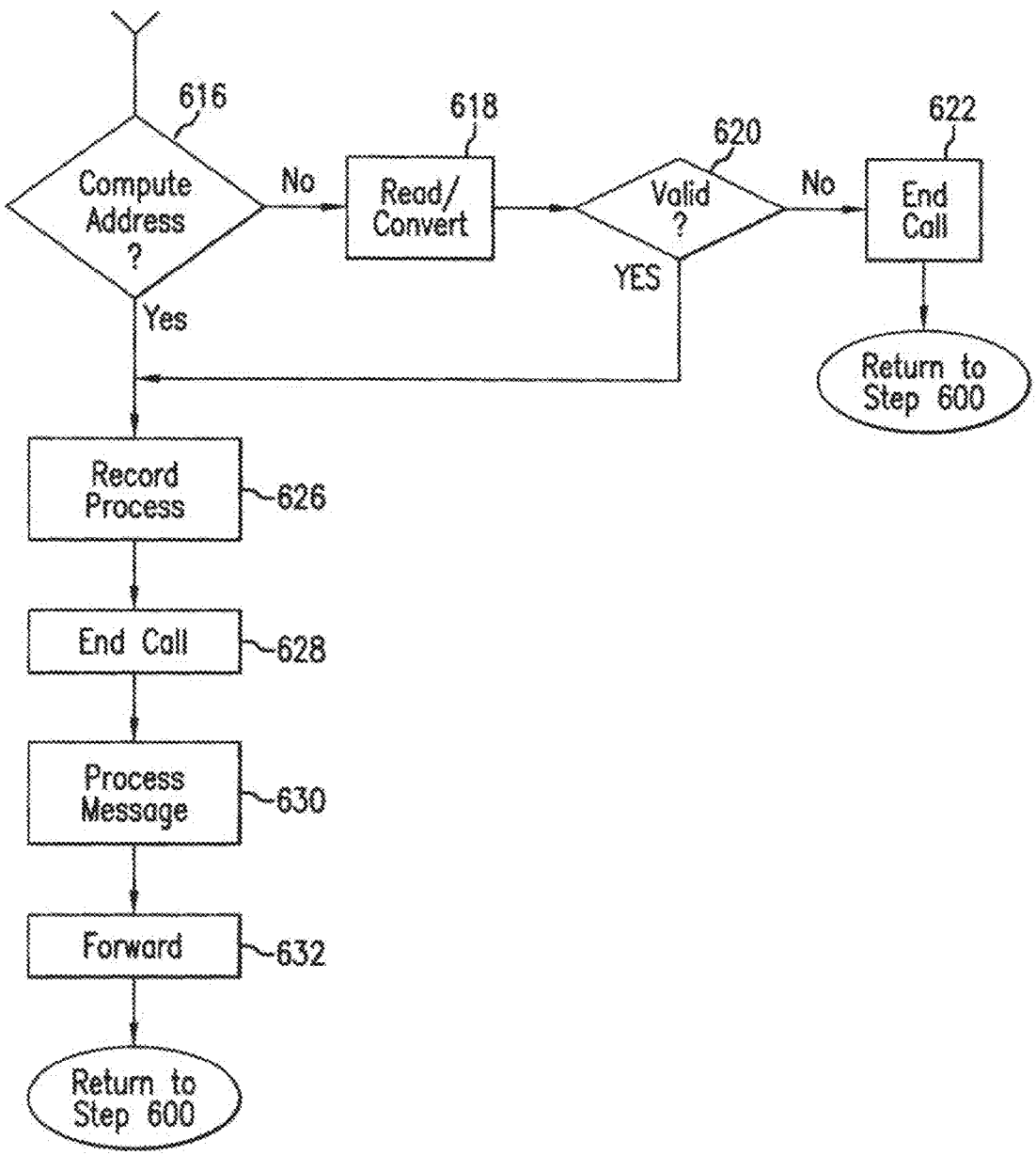
Figure 6C:
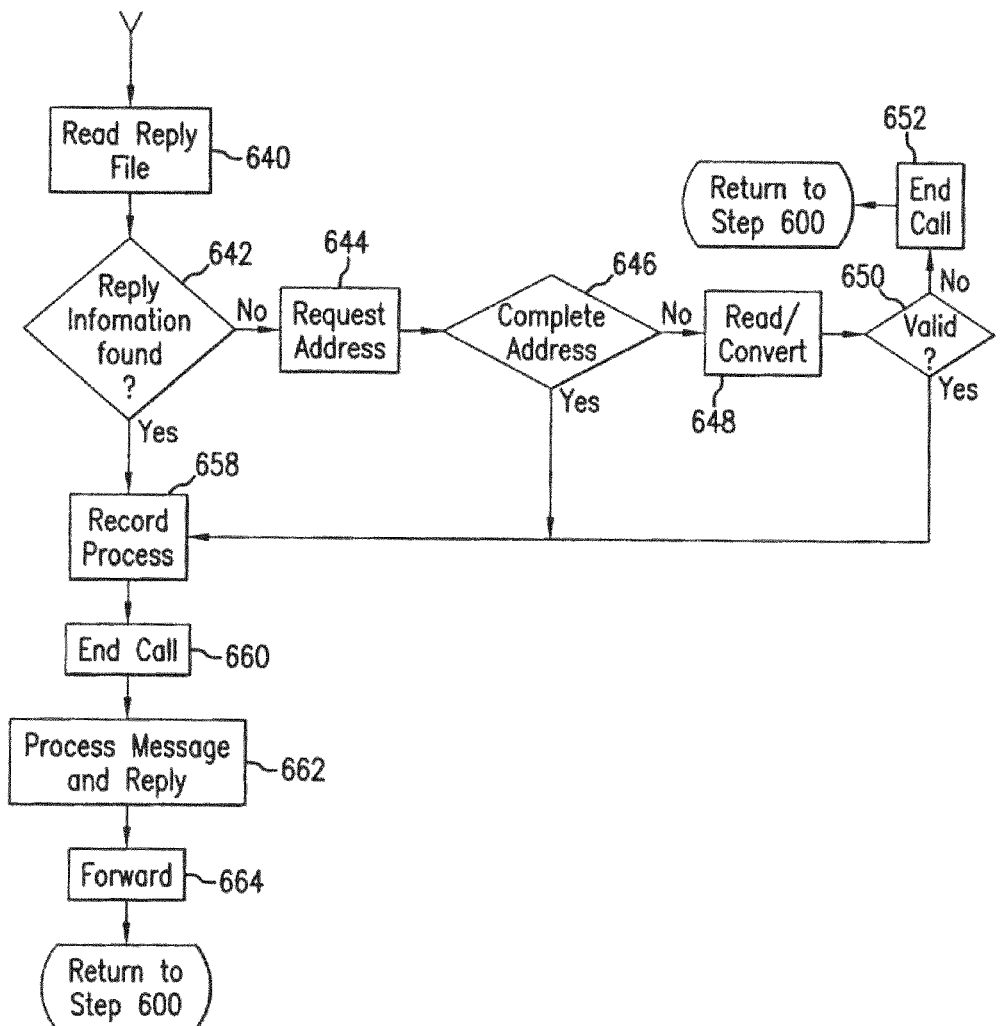

FIGS. 6A-6C illustrate a process for receiving voice messages from a mobile telephone 145 or paging transceiver 140 performed by the IMG 150. Referring to FIG. 6A, the process begins in step 600, where the IMG 150 is placed in call stand-by mode where it awaits a call. When a call is received from a mobile telephone 145, the VMS 510 receives from the MSO 125 subscriber identification data corresponding to the mobile telephone 145 which placed the call (step 602). The subscriber identification data may include the phone number or identification of the mobile telephone 145. The name of the subscriber and the subscriber's messaging address, such as an e-mail address, etc., can be found by the MSO 125 by cross indexing the subscriber identification data.

After step 602, flow proceeds to step 604, where the VMS 510 accepts or rejects the call based on the subscriber identification data. If the call is rejected, flow proceeds to step 606, otherwise flow proceeds to step 608. In step 606 the call is terminated, an error message is transmitted to the mobile telephone 145, and flow returns to step 600.

In step 608, the VMS 510 receives data from the mobile telephone 145. The data may include a request code. The request code indicates the type of action requested. For example, a request code of "01" indicates that the current request is for sending a general message, and a request code "02" indicates that the current request is for sending a reply message. Request codes may also be used for forwarding, cc, bcc, etc. The data may also include addressing information such as an e-mail address, an abbreviated e-mail address, a name, subject matter, type, a reply code, a coded address, etc.

In a preferred embodiment, the present invention utilizes messaging data codes whenever possible in order to conserve transmission time. When a mobile telephone 145 user wishes to originate a message (as opposed to reply to a message), the user selects the name of the person to whom the message is to be sent from an address book stored in the telephone 145. When the user activates the send message command after selecting a recipient, only the message to be forwarded to the recipient, a request code, and a coded address normally needs to be transmitted to the IMG 150.

The request code directs the VMS 510 to perform an action, in this case, the example is to send a message. The coded address corresponds to all other information required to send the message to the recipient, such as the intended recipient's name, e-mail address, message type code, etc. To send a reply message, only the request code and a reply code need be sent together with the reply message.

It should be noted that there are many methods contemplated that may be used for finding information stored at the MSO 125 or IMG 150. A mobile telephone 145 may, for example, transmit the name of the message recipient. The VMS 510, may utilize the received name for looking up the associated address stored in a database associated with the IMG 150 in order to reduce the amount of transmission time required by the mobile telephone 145. The mobile telephone 145 according to the preferred embodiment of the present invention does not transmit the actual addressing information if that information is otherwise available to the IMG 150 or associated interconnected systems via a coded address or the like.

Referring back to FIG. 6A, after step 608, flow proceeds to step 610, where the VMS 510 determines the request based on the received request code. The request may be to forward a message, reply to a message, send a general message, send a cc, send a bcc, etc. For the purpose of illustration, the decision step at step 610 has been limited to send a general message or send a reply message. The process of sending a copy or forwarding a message, etc. may be readily implemented in a manner consistent with the process described in detail hereinafter. If at step 610, it is determined that the request is for sending a general voice message, flow proceeds to step 616, otherwise a reply message is assumed and flow proceeds to step 640.

Referring to FIG. 6B, at step 616, the VMS 510 determines if the message to be sent is completely addressed or if the VMS 510 received a coded address, which needs to be decoded or cross referenced. If the message to be sent is completely addressed, flow proceeds to the record voice message process, step 626. A completely addressed message would include information pertaining to whom the message is from. This information was acquired at step 602 from the MSO 125, as previously described. A completely addressed message also includes the name and e-mail address of the recipient such, as: Bill Jones, "Bjones@hotmail.com".

It is beneficial for the mobile telephone to transmit a complete recipient name and address when the mobile telephone 145 may be roaming in another system area where the IMG 150 does not have a corresponding address book. If at step 616 the VMS 510 determines that coded data representing a recipient was received (i.e. coded address), flow proceeds to step 618. At step 618, the VMS 510 searches an address book stored in its database for a corresponding match. The VMS 510 may alternatively utilize an algorithm for converting the code to an address or name.

After step 618, flow proceeds to step 620, where the VMS 510 determines if the recipient address can be produced from the coded information or found in the VMS 510 address book. If at step 620 an address cannot be obtained, flow proceeds to step 622, where an error is transmitted to the mobile telephone 145, the connection is terminated and the process is returned. If an address is obtained at step 620 flow proceeds to step 626.

Step 626 is a voice recording process performed by the VMS 510. If a real-time voice message is to be received by the VMS 510, then voice prompts are returned to the mobile telephone 145 (e.g., "start recording at the tone"). The VMS 510 allows a caller to review, re-record, append, erase, etc., messages in a manner consistent with typical voice mail systems. If, on the other hand, a non-real-time message is to be received, then voice prompts are not returned. A record type indicator is transmitted from the mobile telephone 145 at the beginning of step 626 indicating the desired recording format (i.e., real-time vs. pre-recorded). A paging transceiver 140 may, for example, utilize the pre-recorded format while a mobile telephone 145 may utilize a real-time recording format.

At step 626, the voice message is received from the mobile telephone 145 and recorded by the VMS 510. Recording stops after an assigned amount of time or after the VMS 510 receives a stop record command from the mobile telephone 145. Recording may also be terminated by the VMS 510 responsive to a noisy communications connection. When the recording is complete, the VMS 510 sends an acknowledgment to the mobile telephone 145 and the communication is terminated (step 628). Flow then proceeds to step 630, where the VMS 510 transfers the voice message and the necessary addressing information to the VMG 520.

The VMG 520 converts the voice message to a conventional audio file format suitable for transmission over the Internet 120 and reproduction by the destination messaging device 105. An example of a conventional audio file format is the ".wav" format developed by Microsoft. The VMG 520 also creates an e-mail message comprising the converted voice message and uses the addressing information to address the e-mail. The converted voice message can be stored in a file and attached to the e-mail message.

The addressed e-mail message is then forwarded to a mail server such as the mail server 530 (step 632). The VMG 520 preferably inserts the words "voice message" in the subject line of the e-mail And inserts instructions for playing the message in the body of the e-mail. It is preferable that the e-mail message be given a priority level equal to primary mail so that it will not be inadvertently filtered by a recipient's e-mail system that limits attachments or treats attachments as secondary mail. After the addressed e-mail message is delivered to the mail server 530, the process returns to step 600. The mail server 530 is responsible for sending the addressed e-mail message to the intended recipient.

Referring back to FIG. 6A, at step 610, if the request is for a reply, flow proceeds to step 640. Referring you to FIG. 6C, at step 640, the VMS 510 searches for the original message and addressing information files for sending a reply message. This information is located by correlating a received reply code with an archived original message file. The original visual message data may be archived on the mail server 530, the VMG 520, the VMS 510 or any other associated device. For this description, the archived e-mail visual message file is stored in an archive file on the mail server 530 for a 5 day period.

After step 640, flow proceeds to step 642, where the VMS 510 determines if the reply information corresponding to the received reply code is present in an archive file. If the reply information is not present, then flow proceeds to step 644, otherwise flow proceeds to step 658.

In step 644, the VMS 510 requests reply addressing information from the mobile telephone 145. Flow then proceeds to step 646, where the VMS 510 analyzes the information received from the mobile telephone 145. If the reply addressing information is complete, flow proceeds to the record process (step 658). If the reply information is coded, flow proceeds to step 648 where the address and or name is calculated or found, as previously described. Flow then proceeds to step 650 where the VMS 510 makes a determination as to the validity of to received data. If no addressing data was received or if the data received was not valid, flow proceeds to step 652, where an error code is returned to the mobile telephone 145, communication is terminated, and the process returns to step 600. If at step 650 it is determined that the data is valid, flow proceeds to step 658.

At step 658, if the process flow is from step 642, the "reply to" name, address, subject matter and text are obtained from the e-mail archive at the mail server 530 via the VMG 520 and appended to the voice message by the VMS 510. The "mailed from" information, as previously described, is obtained by the VMS 510 when communication is established by cross indexing the subscriber identification data with the subscriber data base associated with the VMS 510. At step 658, if the process flow is from step 650 or step 646, a "reply to" name, address and subject matter including "mail from" information is appended or attached to the voice message by the VMS 510.

It should be noted that the preferred method for receiving reply information from a mobile telephone 145 is to receive a reply code in order to conserve transmission time. The original message file stored in the archive at the mail server 530 provides all of the necessary information required to send a reply. The next preferred method for receiving reply information from the mobile telephone 145 is to send a coded address and subject matter. The coded address may then be correlated with the subscribers mailing list stored at the VMS 510 in order to produce the name and/or address. The least favorable method is to receive from the mobile telephone 145 the complete name, complete address and subject matter.

During step 658, the voice message is recorded by the VMS 510 in the same manner as to described with reference to step 626. After step 658, flow proceeds to step 660 where the call is terminated. The VMS 510 then sends to the VMG 520 the recorded voice message, addressing data, and a pointer to or the actual visual message to which the voice message is a reply (step 662). The VMG 520 converts the recorded voice message to an acceptable Internet and messaging device 105 format and packages the reply voice message with the original visual message for transmission. Flow proceeds to step 664, where the VMG 520 forwards the packaged addressed message (i.e. audio and visual) to the mail server 530 for transmission to the messaging device 105, as previously described, and the process returns to step 600.

Figure 7:
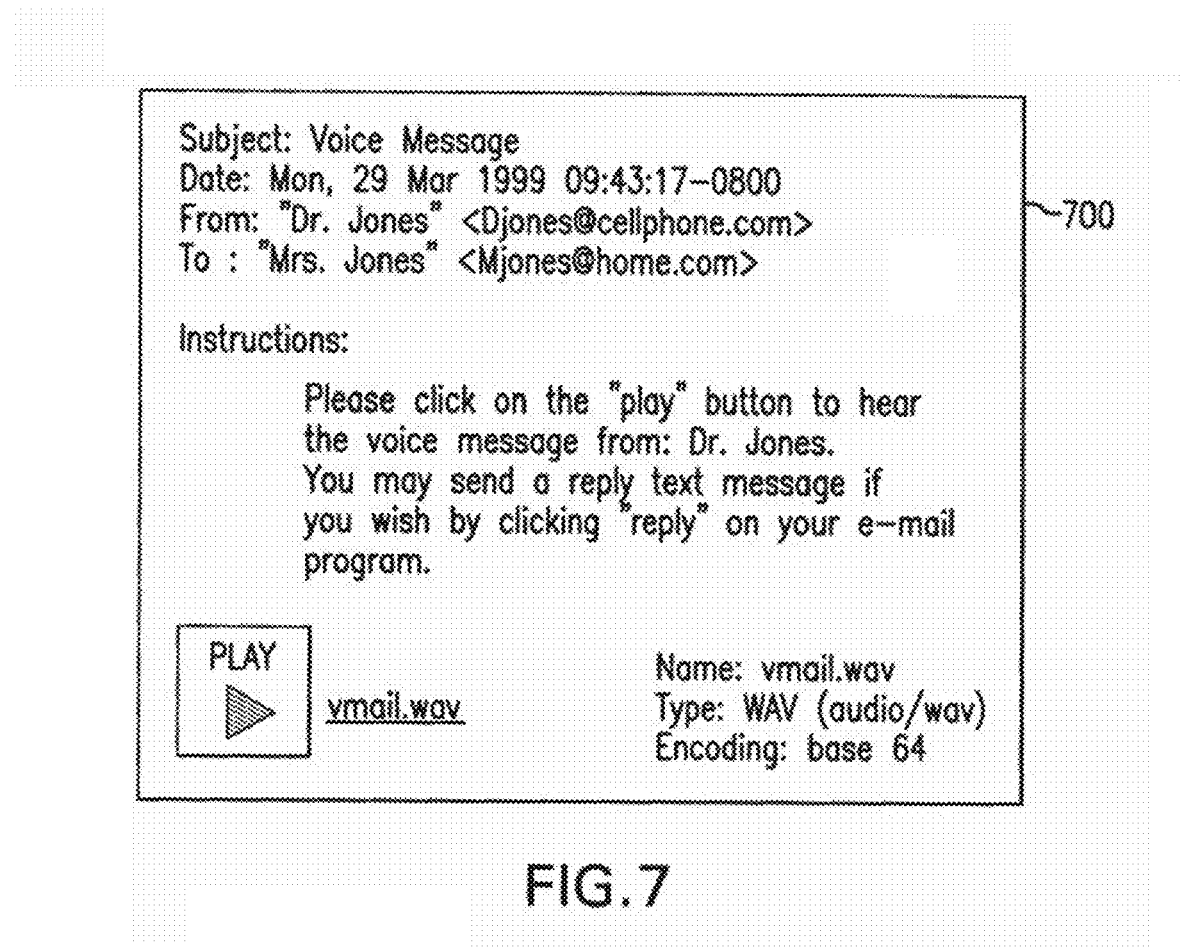
FIG. 7 illustrates an example of a visual message received and displayed by a messaging device.

FIG. 7 illustrates an example of a visual message 700 received and displayed by a messaging device 105. The visual message 700 includes a voice message in the ".wav" format attached thereto. Because the visual message 700 includes a voice message as an attachment the visual message 700 is referred to as an audio/visual message. FIG. 8 illustrates an example of a reply audio/visual message 800 received and displayed by a messaging device 105 including the original visual message sent to the mobile telephone 145. If the original message is no longer archived (as previously described) or available to the IMG 150, the original message would not be included. However, the subject: Re: Airport Delay, would still be included.

Referring once again to FIG. 3, the mobile telephone 145 or paging transceiver 140 can store names and addresses or abbreviated addresses and coded addresses in an address book stored in memory 358. When the mobile telephone 145 receives a visual message, the user may select an "add to list" feature from the user interface 356, causing the controller 357 to add to the address book the name and actual address of the individual who sent the message, along with an abbreviated or coded address corresponding to the actual address.

As previously described, it is preferable that the mobile telephone 145 transmit coded address information representative of an actual address stored in the IMG 150. However, there may be times, such as when the mobile telephone is roaming in another IMG 150 system area, when it is necessary to transmit an un-coded name and address. In order to solve this problem, the mobile telephone 145, according to one embodiment, may store both the complete name and address and a coded address which corresponds to the complete address information stored at the IMG 150.

When the IMG 150 sends a visual message to the mobile telephone 145, complete addressing information is also sent if the coded address is not already stored in memory 358 of the mobile telephone 145. In other words, the IMG 150 need not transmit information to the mobile telephone 145, if the information is already stored there. When a visual message is transmitted to the mobile telephone 145, the IMG 150 first sends a coded address to the mobile telephone 145. The controller 357 then searches for corresponding complete addressing information stored in memory 358. If a match is found, the mobile telephone 145 indicates to the IMG 150 that a match was found. The IMG 150 then does not need to transmit the actual data. It is a simple matter for the controller 357 to insert the corresponding name and address in the proper place within the message indicating from whom the message was sent. If the complete address information including the name is not stored in the memory 358, the mobile telephone 145 indicates to the IMG 150 that a match was not found. The IMG 150 then transmits the complete information to the mobile telephone 145 for storage.

When the mobile telephone 145 receives a visual message from the IMG 150, the message is stored as previously described for viewing on an LCD type display. When a mobile telephone 145 user views the message, the user may elect to save the name and address. The name and address may be saved in memory 358 by selecting the "add to list" option on the user interface which causes the controller 357 to store the address information in the address book in memory 358 for addressing out-going voice messages.

The first time that the mobile telephone 145 transmits the saved address information to the IMG 150 (i.e. when sending a message), the IMG 150 will issue an associated coded address to the mobile telephone 145 for storage in memory 358. The mobile telephone 145 then adds the coded address to the entry in its address book associated with the stored address. The IMG 150 adds the address information and coded address to its address book. In this manner, the mobile telephone 145 need only transmit the complete address information one time. Thereafter, only the coded address need be transmitted.

A mobile telephone subscriber may also add an address to the mobile telephone 145 address book using a messaging device 105. The subscriber may simply send an "address list message" to their own mobile telephone 145. An "address list message" is a visual message having a predetermined format and including a list of names and corresponding addresses. One example of an address list message is an e-mail message wherein the body of the e-mail includes a list of address book entries, wherein each entry includes a name and at least one corresponding address. FIG. 9 illustrates one embodiment of an address list message. When an address list message is received by the IMG 150, the IMG 150 detects that the message is an address list message based on its format and reads the names and address, and transmits the names, addresses and corresponding coded address information to the mobile telephone 145 for addition to the mobile telephone 145 address book. The IMG 150 also adds the same names, addresses and to corresponding coded addresses to its address book. In an alternative embodiment, the address list message is sent to the mobile telephone 145. Upon the address list message being received, the controller 357 parses the message to obtain the names and corresponding addresses to be added to the address book. After obtaining the names and corresponding addresses, the controller adds them to the address book.

The integrated voice and visual messaging system described and illustrated herein is readily adaptable to a plurality of messaging formats, protocols, modulation schemes and system configurations. Voice messages may be transmitted from a mobile communication device such as a paging transceiver 140 or a mobile telephone 145 to an integrated message gateway for forwarding over the Internet or other type of network to a personal computer or other visual messaging device. Voice messages may be transmitted to the integrated mail gateway in analog or digital format. Additionally, voice messages may be pre-recorded at the mobile communication device for non real-time transmission or real-time voice messages may be transmitted to the integrated mail gateway for forwarding in non real-time. The system is adaptable to various wireless telephone systems and paging systems. The mobile communication device may be configured in a mobile telephone, pager, wireless PDA, or other wireless device which provides visual messaging and includes means for voice communications.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents:

What is claimed is:

1. A method for integrating voice and text messaging comprising:

an integrated mail gateway (i) storing a text message, and (ii) receiving reply messaging data and voice data from a first wireless cellular messaging device as a response to a text message;

the integrated mail gateway, upon receiving the reply messaging data and voice data, using said reply messaging data to generate a message for transmission to a second wireless cellular messaging device, the message including said text message from the memory and the voice data.

* * * * *